United States Patent
Suzuki et al.

(10) Patent No.: US 6,366,332 B1
(45) Date of Patent: Apr. 2, 2002

(54) DISPLAY APPARATUS AND PROCESS FOR PRODUCTION THEREOF

(75) Inventors: Hiroyuki Suzuki; Mitsuharu Sawamura, both of Yokohama; Makoto Kameyama, Funabashi; Toshiaki Yoshikawa, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,247

(22) Filed: Feb. 23, 2000

Related U.S. Application Data

(62) Division of application No. 08/811,296, filed on Mar. 4, 1997, now Pat. No. 6,128,507.

(30) Foreign Application Priority Data

| Mar. 8, 1996 | (JP) | ................................ 8-052143 |
| Mar. 8, 1996 | (JP) | ................................ 8-052144 |
| Mar. 8, 1996 | (JP) | ................................ 8-052145 |

(51) Int. Cl.$^7$ .............................. G02F 1/333; G03F 9/00
(52) U.S. Cl. ............................ 349/110; 349/111; 430/7
(58) Field of Search ................................ 399/110, 111, 399/187; 450/7

(56) References Cited

U.S. PATENT DOCUMENTS

| 4,396,683 A | 8/1983 | Hatano et al. ............... 428/469 |
| 4,958,104 A | 9/1990 | Suzuki et al. ............... 313/495 |
| 5,248,576 A | 9/1993 | Yokoyama et al. ......... 349/110 |
| 5,251,071 A | 10/1993 | Kusukawa et al. ......... 349/110 |
| 5,418,094 A | 5/1995 | Sato et al. ..................... 430/7 |
| 5,527,649 A | 6/1996 | Sato et al. ..................... 430/7 |
| 5,718,992 A | 2/1998 | Sato et al. ................... 349/110 |
| 5,828,352 A | 10/1998 | Nomura et al. ............... 345/74 |

FOREIGN PATENT DOCUMENTS

| EP | 0 901 032 | 3/1999 |
| JP | 61-235819 | 10/1986 |
| JP | 63-172222 | 7/1988 |
| JP | 63-274929 | 11/1988 |
| JP | 63-307693 | 12/1988 |
| JP | 1-239523 | 9/1989 |
| JP | 2-144525 | 6/1990 |
| JP | 3-80414 | 8/1991 |
| JP | 4-1727 | 1/1992 |
| JP | 4-1728 | 1/1992 |
| JP | 4-40420 | 1/1992 |
| JP | 5-127014 | 1/1993 |
| JP | 5-179437 | 7/1993 |
| JP | 5-188366 | 7/1993 |
| JP | 6-222354 | 8/1994 |
| JP | 6-324326 | 11/1994 |
| JP | 7-104309 | 4/1995 |
| JP | 8-36171 | 2/1996 |

OTHER PUBLICATIONS

Database WPI, Week 9333, Derwent Publications Ltd., AN 93–262071, XP002045490, Abstract (JP–5–179437; Jul. 1993).

Database WPI Week 9615, Derwent Publications Ltd., AN 96–147912, XP002045491, Abstract (JP–8–36171; Feb. 1996).

*Primary Examiner*—Toan Ton
(74) *Attorney, Agent, or Firm*—Fitzpatrick, Cella, Harper & Scinto

(57) ABSTRACT

A display apparatus includes a planar optical modulation device having a transparent substrate and a plurality of pixels disposed thereon so as to be each capable of optical modulation thereat, and a masking member disposed on the transparent substrate and including spacings. The making member includes a layer of a metal compound containing C, O and a metal element. The masking member is effective in reducing a degree of reflection of external light (from a viewer side) while maintaining a sufficient light-interrupting property, thus resulting in a display apparatus exhibiting good display performances.

6 Claims, 13 Drawing Sheets

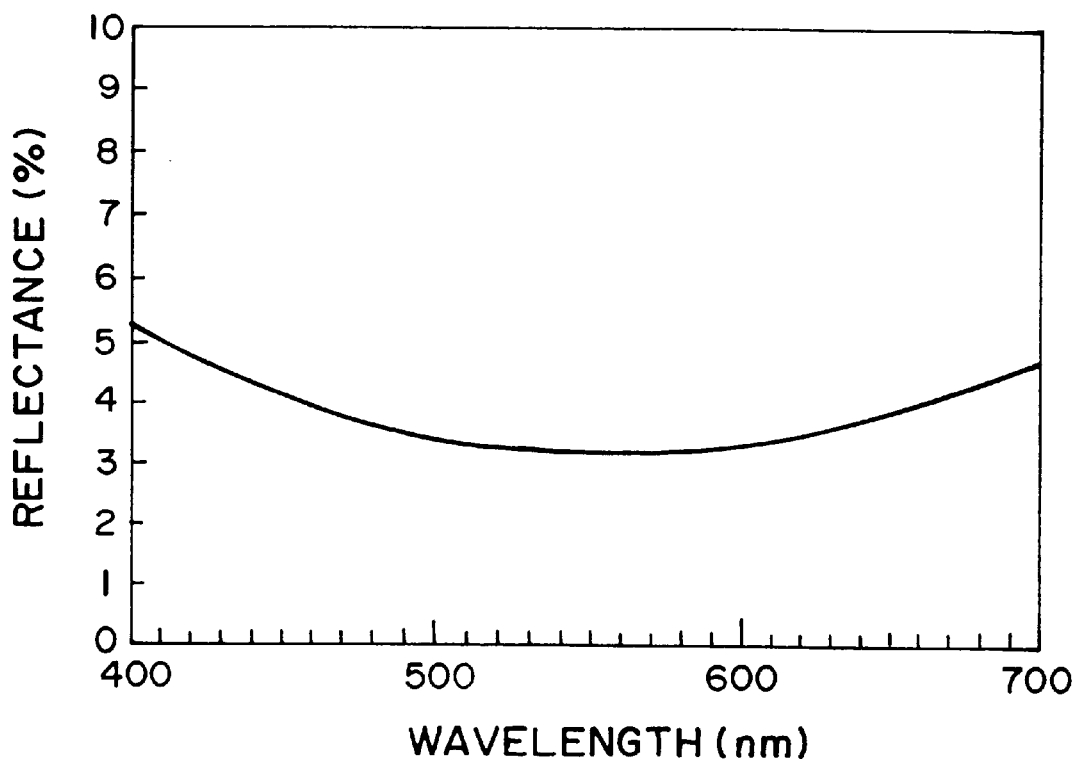
F I G. 7

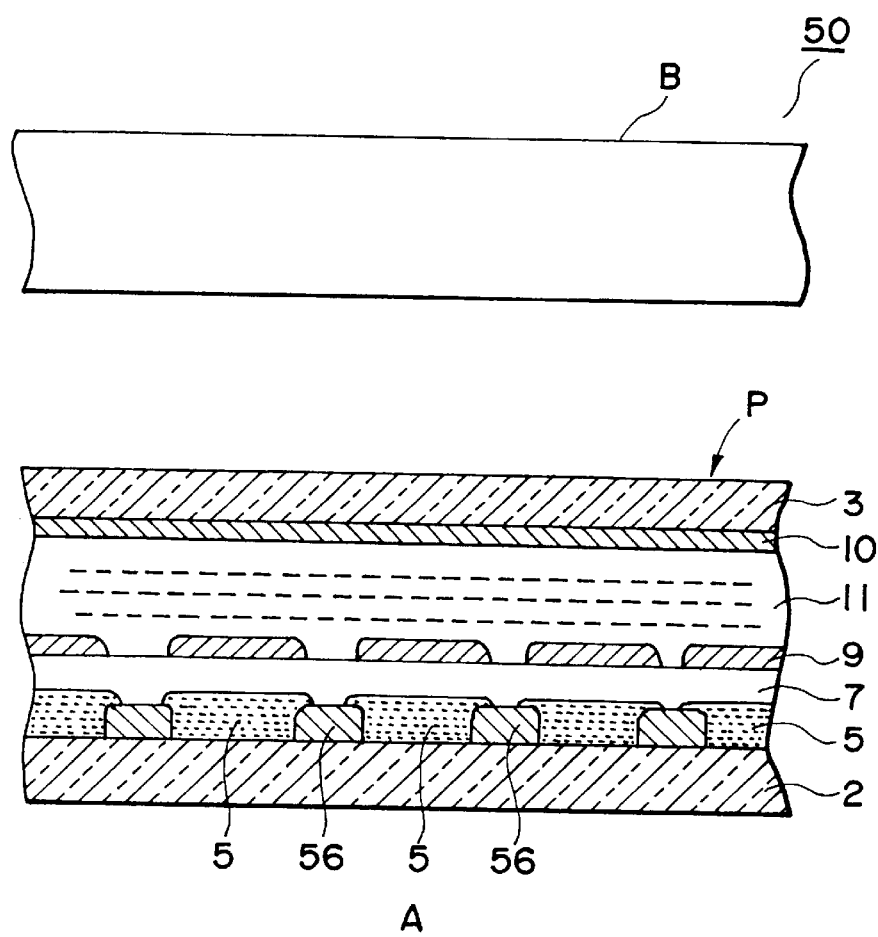
F I G. 8A
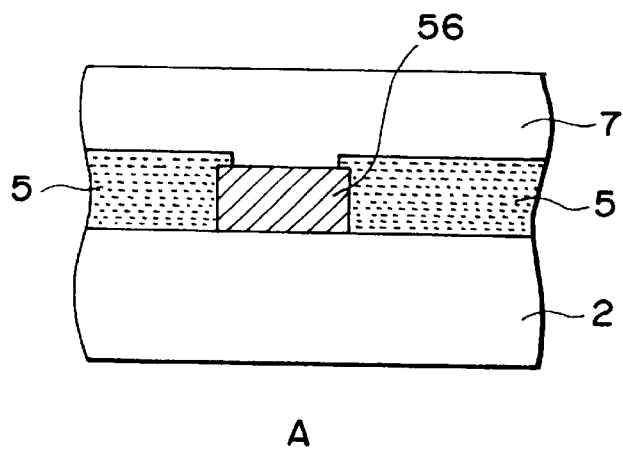
F I G. 8B

A

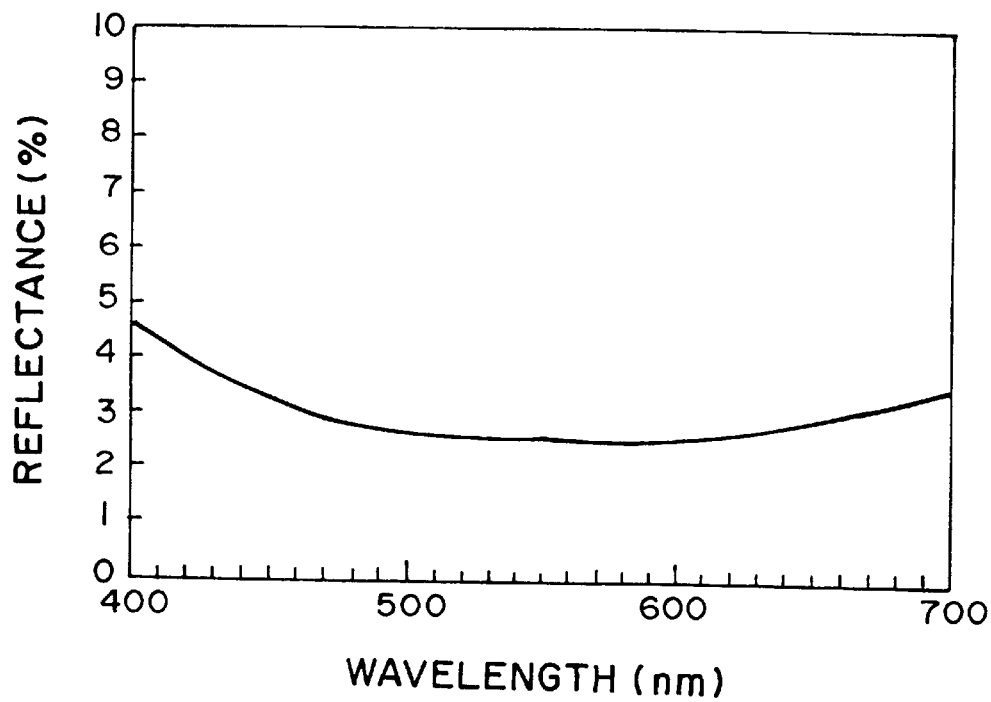
F I G. 11
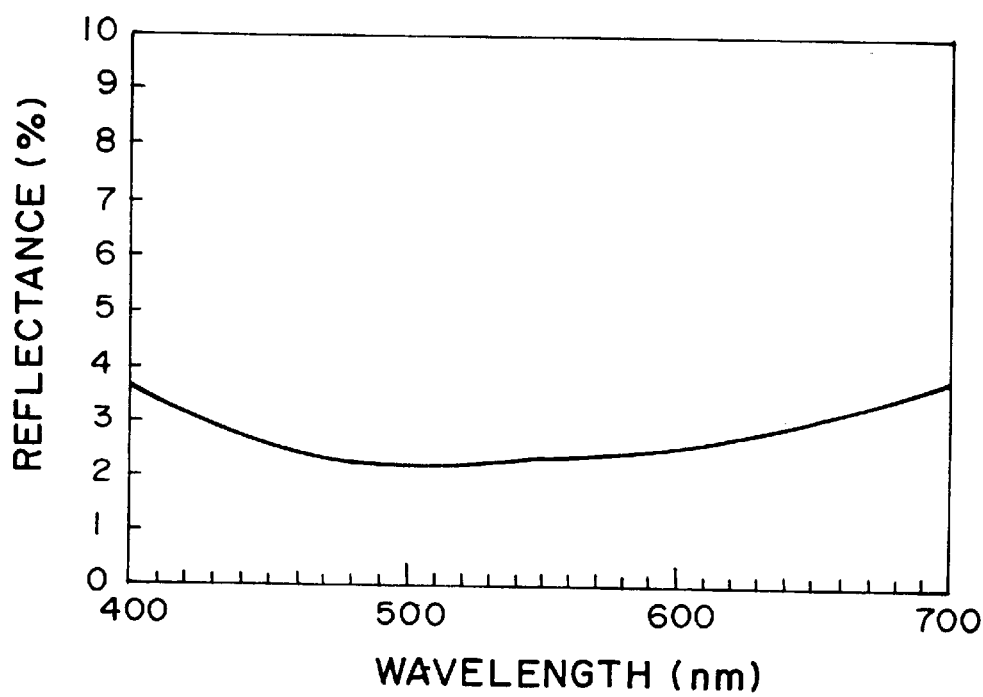
F I G. 12

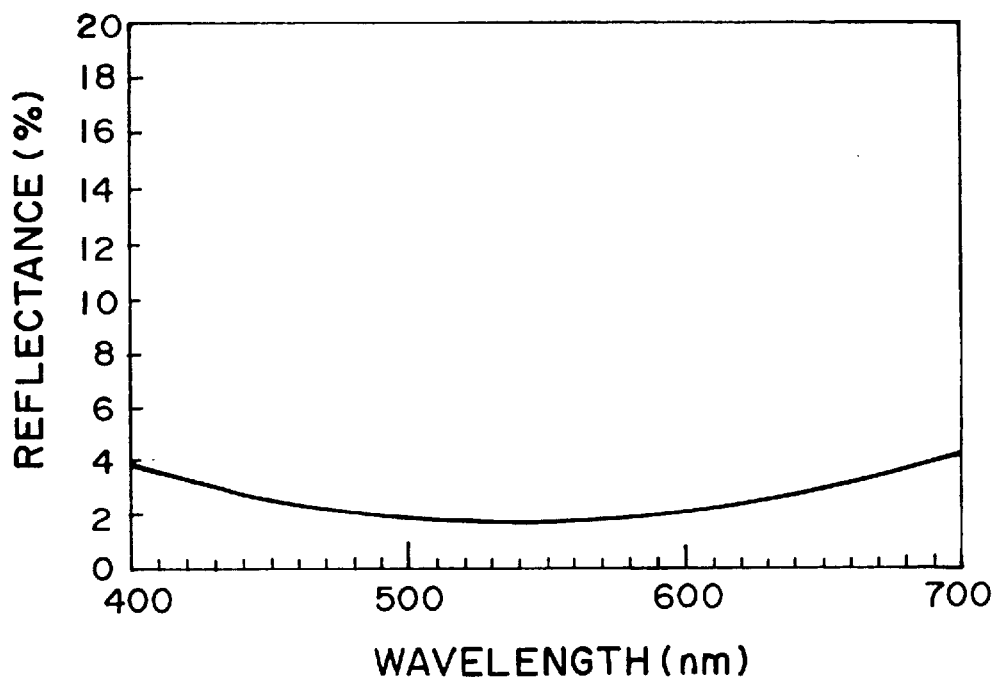
F I G. 17
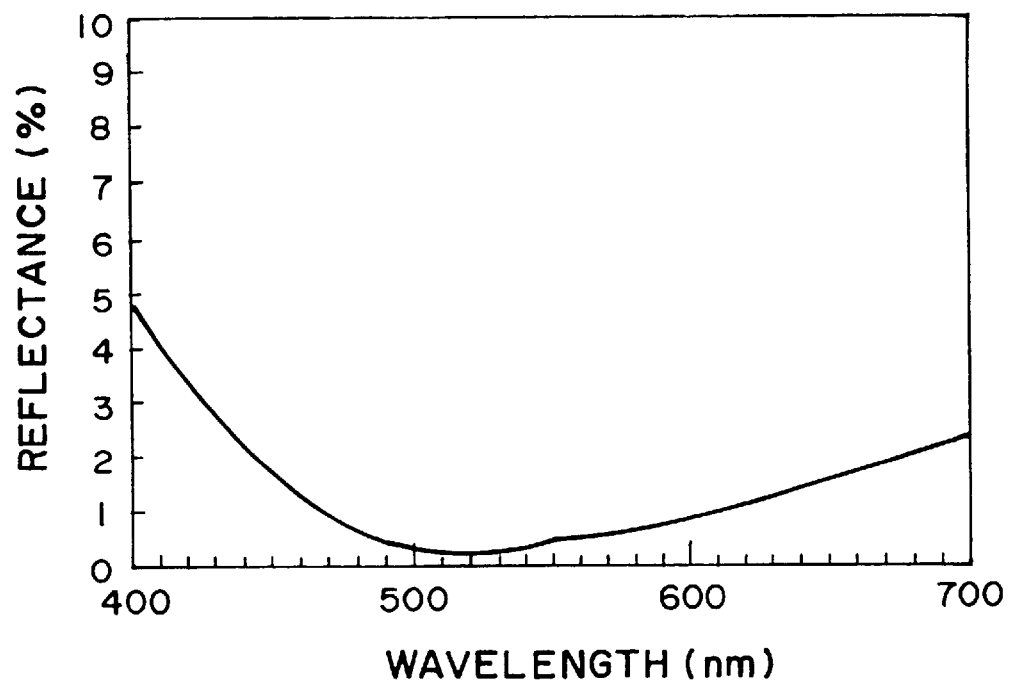
F I G. 18

DISPLAY APPARATUS AND PROCESS FOR PRODUCTION THEREOF

This application is a divisional application of Ser. No. 08/811,296, filed Mar. 4, 1997, U.S. Pat. No. 6,128,507.

FIELD OF THE INVENTION AND RELATED ART

The present invention relates to a display apparatus, particularly a color display apparatus, and a process for producing the display apparatus. More specifically, the present invention relates to a display apparatus including an electrode plate provided with a masking member improved in various properties (particularly optical properties) and productivity, and a process for production of the display apparatus.

Heretofore, a color display apparatus using a CRT (cathode-ray tube) has generally been used.

In recent years, however, various color liquid crystal apparatus have attracted considerable attention as a color display apparatus replacing the above CRT display apparatus.

FIG. 1 shows an example of such color liquid crystal apparatus.

Referring to FIG. 1, a liquid crystal display apparatus 1 includes a liquid crystal panel P and a backlight unit B.

The liquid crystal panel P includes a pair of glass substrates disposed opposite to and in parallel with each other and comprising a first (upper) glass substrate 3 and a second glass (lower) substrate 2. The second (lower) glass substrate 2 is provided with color filters (i.e., color filter segments) 5 of primary colors (red (R), green (G) and blue (B)) disposed with prescribed spacings at which a masking (light-interrupting) film 6 comprising a metal such as chromium (Cr) is disposed. The color filters 5 and the masking film 6 are covered with a protective film 7 on which a multiplicity of stripe-shaped (transparent) electrodes 9 are formed to prepare a second electrode plate. On the other hand, the first (upper) glass substrate 3 is also provided with a multiplicity of stripe-shaped (transparent) electrodes 10 disposed perpendicular to the stripe-shaped electrodes 9 to prepare a first electrode plate. These first and second glass substrates 3 and 2 (electrode plates) are applied to each other via a liquid crystal layer 11.

The color filters 5 may be formed by using processes including a dyeing process, a pigment-dispersion process and a combination of a sputtering process and a photolithographic process. The masking film 6 may be formed through a sputtering process and a subsequent photolithographic process.

On the back side of the liquid crystal panel P, a backlight unit (illumination means) for illuminating the liquid crystal panel P is disposed so as to face the first glass substrate 3 as shown in FIG. 1.

When the liquid crystal panel P is driven, liquid crystal molecules of the liquid crystal layer 11 are caused to effect switching for each pixel. Further, when the backlight unit B is driven (actuated), the liquid crystal panel P is illuminated with light issued from the backlight unit B (hereinbelow, referred to as "backlight or illuminating light"), whereby transmitted light fluxes of the backlight (illuminating light) provide various information as color display images depending on combinations thereof with the color filter segments through which the backlight passes. Between the spacings of the color filter segments of the color filter 5, the masking film 6 is disposed as mentioned above, whereby it is possible to prevent mixing of the primary colors to improve a contrast.

However, the above liquid crystal apparatus was accompanied with a problem such that light issued from a viewer side indicated as "A" in FIG. 1 (hereinbelow, referred to as "external light" illuminating the panel in a direction opposite to that of the backlight) was reflected by the masking film 6 to lower a display quality of the liquid crystal panel P.

In order to solve the problem, the use of a masking film 16 or 26 (as shown in FIG. 2A or 2B) having a lamination structure comprising two or three layers has been proposed in, e.g., Japanese Laid-Open Patent Application (JP-A) 2-144525 and 61-235819. Referring to FIG. 2A, the masking film 16 includes a first layer 16a consisting of a metal (chromium) film disposed on the second substrate 2 and a second layer 16b consisting of a metal oxide (chromium oxide) film disposed on the first layer 16a. Similarly, referring to FIG. 2B, the masking film 26 has a lamination structure including a second layer 26b consisting of a metal (chromium) film disposed between first and third layers 26a and 26c each consisting of a metal oxide (chromium oxide) film. These masking films 16 and 26 are designed to retain a good display quality by the metal oxide film(s) (the first and third layers 16a, 26a and 26c) effective in decreasing a degree of the reflection of the external light and to ensure a sufficient light-interrupting property.

These masking films 16 and 26 are generally formed through a sputtering process. In the sputtering process, in case where a batch-type sputtering apparatus, it is necessary to adopt different sputtering conditions for forming the metal film and the metal oxide film. For this purpose, there has been used several methods including: (i) one wherein a mixture gas of Ar and $O_2$ (as an ambient gas) and a metal target (chromium in the above case) are used for forming a metal oxide film (e.g., the first layers 16a and 26a shown in FIGS. 2A an 2B) and then the ambient gas is replaced by an Ar gas while using the metal target as it is for forming a metal film (e.g., the second layers 16b and 26b shown in FIGS. 2A and 2B), and (ii) one wherein an ambient gas of Ar and a metal oxide target are used for forming a metal oxide film (e.g., the first layers 16a and 26a) and then the metal oxide target is replaced by a metal target without changing the ambient Ar gas for forming a metal film (e.g., the second layers 16b and 26b).

Further, as a method not using a batch process, it is possible to apply a method using a continuous-type (or load lock-type) sputtering apparatus wherein a substrate is transferred from a first chamber charged with a mixture gas of Ar and $O_2$ for forming a metal oxide film (e.g., the first layers 16a and 26a) to a second chamber partitioned with a gate valve by the first chamber and charged with an Ar gas for forming a metal film (e.g., the second layers 16b and 26b).

The thus formed metal oxide and metal films constituting a lamination structure are then subjected to patterning through a photolithographic process to form a patterned masking film having the lamination structure.

However, the above-described masking films 16 and 26 prepared in the above manner were accompanied with several problems due to their lamination structures.

More specifically, it was difficult to design a lamination structure capable of keeping a balance of a decreased degree of the external light reflection (i.e., a decreased reflectance) and an improvement in light-interrupting property in the case of the masking films including the above-described combinations of the metal oxide film and the metal film.

Further, in the conventional lamination structure of the masking film as described above, the metal oxide film and the metal film showed different etching degrees at the time of patterning by the photolithographic process, thus causing uneven (stepwise) side surfaces or a stepwise difference in width with respect to the metal and metal oxide films (i.e., a wider metal oxide film and a narrower metal film) to deteriorate a display quality of the liquid crystal panel P. In the case of using a sputtering target of a metal oxide, there arises a problem with respect to mass production, such as a slow sputtering rate and a crack in (or breakage of) the target. Further, in case where the continuous-type sputtering apparatus is used, the apparatus is accompanied with problems, such as an expensive apparatus and complicated film-forming steps, thus resulting in an increase in production cost.

In order to lower a degree of the external light reflection, it is necessary to appropriately control an oxygen content of a metal oxide film used so as to provide the metal oxide film with an extinction coefficient within an appropriate range in a film-forming step. For example, however, chromium (Cr) has a very high activity with respect to oxygen, so that it is difficult to appropriately control the extinction coefficient range vary depending on a resultant oxygen content, thus failing to provide a color display apparatus exhibiting a good display quality. As a result, a yield of the product is lowered to increase production cost.

There have been also proposed processes for forming a masking film including: one wherein a dyeable synthetic resin is patterned and then dyed with a black dye and one wherein black ink coated through a printing process is subjected to patterning.

In these processes, however, a sufficient light-interrupting (masking) property cannot be ensured in some cases when a thin film is formed. Further, in the latter process, accuracy in patterning or registration is liable to be lowered.

SUMMARY OF THE INVENTION

An object of the present invention is to provide a color display apparatus with a high quality and a high accuracy.

Another object of the present invention is to provide a color display apparatus capable of suppressing a stepwise defect due to a difference in etching degree to attain a high quality and a high accuracy.

Another object of the present invention is to provide a color display apparatus capable of lowering its production cost by reducing a production time.

Another object of the present invention is to provide a color display apparatus capable of simplifying production steps.

Another object of the present invention is to provide a color display apparatus capable of decreasing a degree of external-light reflection to improve a display quality.

Another object of the present invention is to provide a color display apparatus capable of preventing an undesired color mixing to attain an excellent display quality.

Another object of the present invention is to provide a color display apparatus not causing a lowering in image quality resulting from stray light.

Another object of the present invention is to provide a color display apparatus capable of preventing a low film-forming rate and a breakage of a target during a step of forming a masking member to allow mass production.

Another object of the present invention is to provide a color display apparatus capable of reducing production cost through an improvement in a production yield.

Another object of the present invention is to provide a color display apparatus capable of reducing a cost of disposal of waste solvent (solution).

A further object of the present invention is to provide a process for producing the above-described color display apparatus.

According to a first aspect of the present invention, there is provided a display apparatus, comprising:

a planar optical modulation device comprising a transparent substrate and a plurality of pixels disposed thereon so as to be each capable of optical modulation thereat, and a masking member disposed on the transparent substrate and with spacings, wherein the making member includes a layer of a metal compound containing C, O and a metal element (herein, including a single metal and an alloy).

The display apparatus may preferably further include a plurality of color filters disposed in alignment with the pixels and on the transparent substrate at the spacings of the masking member. The masking member may comprise a first portion located at a first boundary between the transparent substrate and the masking member and having a first refractive index and a first extinction coefficient, and a second portion located at a second boundary opposite to the first boundary and having a second refractive index larger than the first refractive index and a second extinction coefficient larger than the first extinction coefficient. Further, the masking member comprise at least a first layer disposed on the transparent substrate and a second layer disposed on the first layer, wherein the first layer has a refractive index $n_1$ and an extinction coefficient $k_1$ and the second layer has a refractive index $n_2$ and an extinction coefficient $k_2$ satisfying the following relationships: $n_1<n_2$ and $k_1<k_2$. In this case, the masking layer may further comprise a third layer disposed on the second layer and having a refractive index $n_3$ and an extinction coefficient $k_3$, wherein the refractive index $n_1$ is equal to or smaller than the refractive index $n_2$ or $n_3$ and the extinction coefficient $k_1$ is equal to or smaller than the extinction coefficient $k_2$ or $k_3$. The above refractive indices $n_1$, $n_2$ and $n_3$ and the extinction coefficients $k_1$, $k_2$ and $k_3$ may preferably satisfy the following relationships: $n_1<n_2$, $n_3<n_2$, $k_1<k_2$ and $k_3<k_2$. The masking member may have a refractive index and a extinction coefficient respectively increase continuously with an increasing distance from the transparent substrate. In the above display apparatus, the metal element may comprise Mo, preferably Mo and Ta.

The above-mentioned display apparatus may preferably further comprise another transparent substrate disposed opposite to and in substantially parallel with the transparent substrate, and a liquid crystal disposed between the transparent substrates. The display apparatus may further comprise an illumination means disposed on the back side of another transparent substrate.

According to a second aspect of the present invention, there is provided a display apparatus, comprising:

a planar optical modulation device comprising a transparent substrate and a plurality of pixels disposed thereon so as to be each capable of optical modulation thereat, and a masking member disposed with spacings and including a first layer disposed on the transparent substrate, a second layer disposed on the first layer and a third layer disposed on the second layer, wherein each of the first to third layers comprises a layer of a metal compound containing a metal element and at least one of C and O.

In the above type of display apparatus, the apparatus may preferably further comprise a plurality of color filters disposed in alignment with the pixels and on the transparent substrate at the spacings of the masking member. Each of the first to third layers may contain at least one of C and O, preferably both C and O.

In the above apparatus (second aspect of the invention), the first layer may preferably have a refractive index $n_1$ and an extinction coefficient $k_1$, the second layer has a refractive index $n_2$ and an extinction coefficient $k_2$, and the third layer has a refractive index $n_3$ and an extinction coefficient $k_3$; wherein the refractive index $n_1$ is equal to or smaller than the refractive index $n_2$ or $n_3$ and the extinction coefficient $k_1$ is equal to or smaller than the extinction coefficient $k_2$ or $k_3$. In this case, the refractive indices $n_1$, $n_2$ and $n_3$ and the extinction coefficients $k_1$, $k_2$ and $k_3$ satisfy the following relationships:

$$n_2 < n_1 < n_3 \text{ and } k_2 < k_1 < k_3.$$

In the above apparatus (second aspect), the first layer may contain Mo, preferably Mo and Ta, and the second layer may contain Al or Si. The apparatus may preferably further comprise another transparent substrate disposed opposite to and substantially parallel with the transparent substrate, and a liquid crystal disposed between the transparent substrates. The apparatus may further comprise an illumination means disposed on the back side of the another transparent substrate.

In the apparatus of the first aspect of the invention, the masking member may include a first layer disposed on the transparent substrate and comprising a metal compound containing C, O and a metal element and a second layer disposed on the first layer and comprising a metal element. In the display apparatus of this type, the first layer may be controlled to have a carbon content and an oxygen content each being substantially uniform in a direction of its thickness or each decreasing from the transparent substrate side toward the second layer side in a direction of its thickness. Further, the masking member may further comprise a third layer disposed on the second layer and containing C, O and a metal element, which may be selected from the group consisting of Mo, Ti, Cr, Al, Ta and W. In this case, the third layer may preferably contain Mo. Similarly, the first layer may contain a metal element selected from the group consisting of Mo, Ti, Cr, Al, Ta and W and the second layer may contain a metal element selected from the group consisting of Mo, Ti, Cr, Al, Ta and W. In this instance, the first layer may preferably contain Mo and the second layer may preferably contain Mo. Further, the first layer may desirably have an extinction coefficient k satisfying the following relationship: $0.2 \leq k \leq 1.0$. The apparatus may further comprise another transparent substrate disposed opposite to and substantially parallel with the transparent substrate, and a liquid crystal disposed between the transparent substrates. The apparatus may also comprise an illumination means disposed on the back side of the another transparent substrate.

The present invention further provides a process for producing a display apparatus of the type comprising a planar optical modulation device comprising a transparent substrate and a plurality of pixels disposed thereon so as to be each capable of optical modulation thereat, and a masking member disposed on the transparent substrate and with spacings; wherein the process comprises: a sputtering step wherein a layer of a metal compound comprising C, O and a metal element is formed on a transparent substrate by sputtering with an ambient gas including C, O and Ar.

The present invention further provides a process for producing a display apparatus of the type comprising a planar optical modulation device comprising a transparent substrate and a plurality of pixels disposed thereon so as to be each capable of optical modulation thereat, and a masking member disposed with spacings and including a first layer, a second layer and a third layer; wherein the process comprises:

forming the first layer on a transparent substrate by sputtering, forming the second layer on the first layer by sputtering, and forming the third layer on the second layer by sputtering;

wherein the first to third layers are respectively formed by using an ambient gas comprising Ar and at least one of C and O, the first and third layers are respectively formed by using a target of a first metal element, and the second layer is formed by using a target of a second metal element.

In the latter process described above, the first metal element may preferably comprise Mo and the second metal element may preferably comprise Al or Si. In this case, the first metal element may particularly preferably be an alloy of Mo and Ta. Further, the ambient gas may preferably comprise a mixture gas of Ar and $CO_2$ in the steps for forming the first to third layers.

In the former and the latter processes described above, the sputtering may be performed by changing a sputtering power so as to provide an objective layer with a prescribed refractive index and a prescribed extinction coefficient.

The present invention further provides a process for producing a display apparatus of the type comprising a planar optical modulation device comprising a transparent substrate and a plurality of pixels disposed thereon so as to be each capable of optical modulation thereat, and a masking member disposed with spacings and including a first layer and a second layer; wherein the process comprises the steps of:

forming the first layer on the transparent substrate by sputtering with a target comprising a metal element selected from the group consisting of Ti, Cr, Al, Ta, Mo and W and with an ambient gas comprising a mixture gas of Ar and $CO_2$, and forming the second layer on the first layer by sputtering with a target comprising a metal element selected from the group consisting of Ti, Cr, Al, Ta, Mo and W and with an ambient gas of Ar.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 7 is a graph showing a relationship between a reflectance and a wavelength as an effect of the third embodiment.

FIG. 8A is a schematic sectional view showing a structure of a liquid crystal display apparatus including a masking member adopted in a fourth embodiment (appearing hereinafter) according to the present invention and FIG. 8B is a schematic sectional view of an enlarged masking member portion of the display apparatus shown in FIG. 8A.

FIG. 11 is a graph showing a relationship between a reflectance and a wavelength as an effect of the fifth embodiment.

FIG. 12 is a graph showing a relationship between a reflectance and a wavelength as an effect of the sixth embodiment.

FIG. 17 is a graph showing a relationship between a reflectance and a wavelength as an effect of the eighth embodiment.

FIG. 18 is a graph showing a relationship between a reflectance and a wavelength as an effect of the ninth embodiment.

DESCRIPTION OF THE PREFERRED EMBODIMENTS

Figure 1:
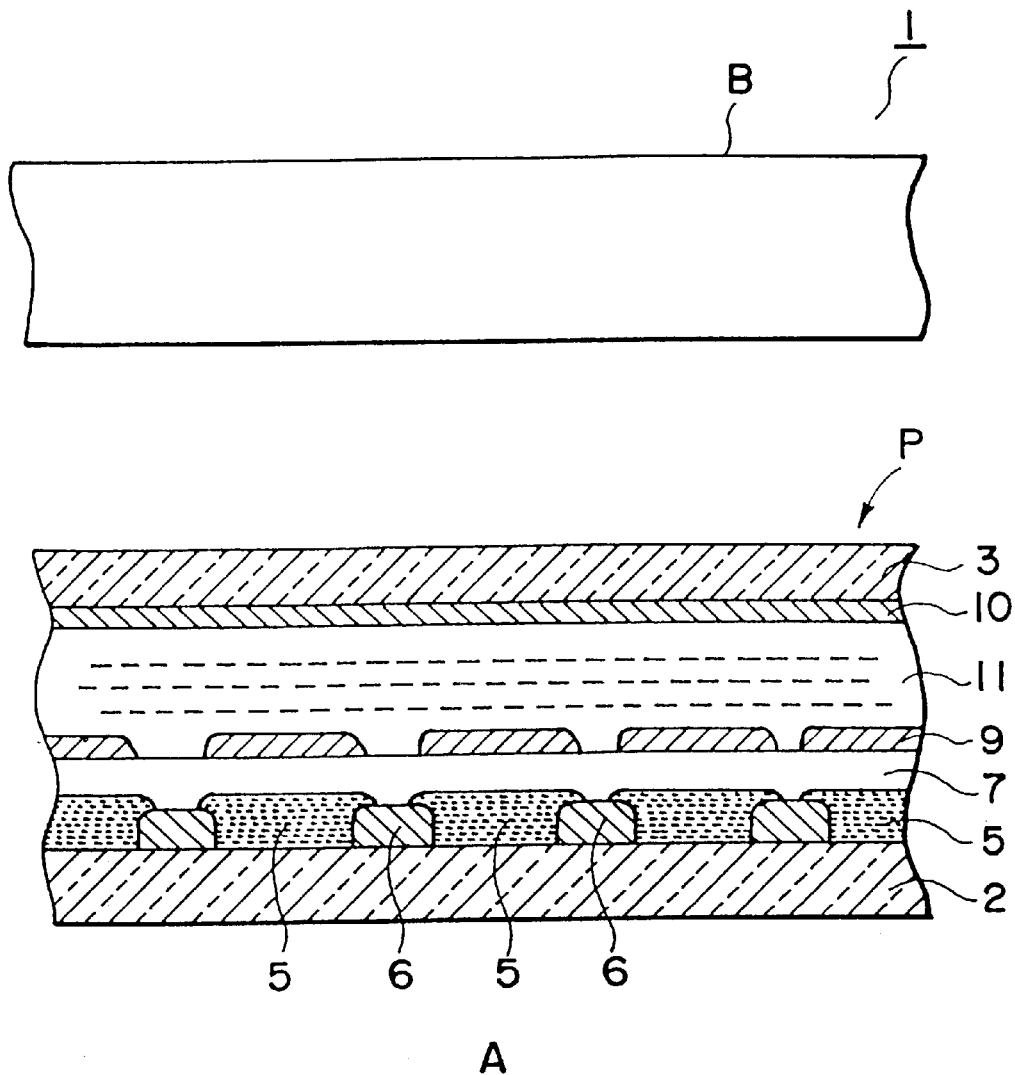
FIG. 1 is a schematic sectional view showing an embodiment of a general structure of a liquid crystal display apparatus.
Figure 2A:
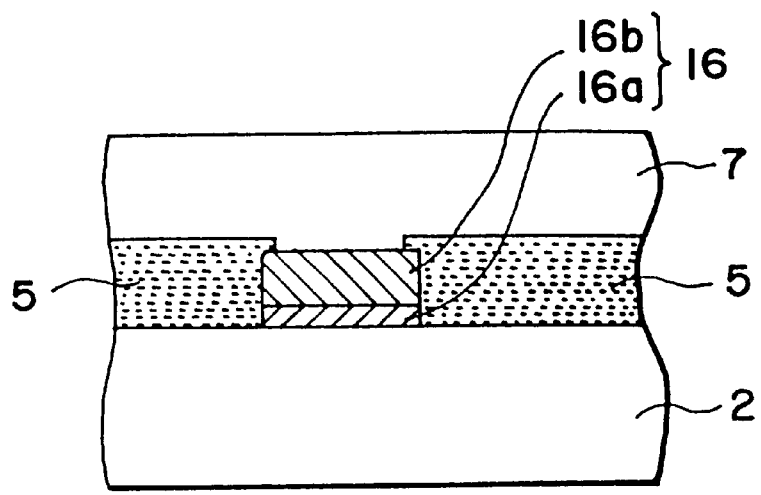
FIGS. 2A and 2B are respectively a schematic sectional view for illustrating a structure of a conventional masking layer of two-layer type (FIG. 2A) or three-layer type (FIG. 2B).
Figure 2B:
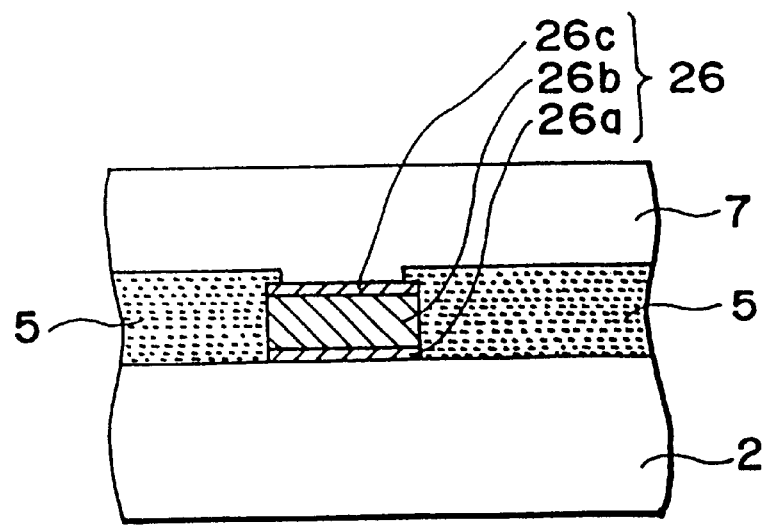

Hereinbelow, the display apparatus according to the present invention will be described with reference to FIGS. 3–20 wherein identical structural members (components) are indicated by identical reference numerals, respectively, unless otherwise specified. Further, an explanation of structural members indicated by the reference numerals identical to those shown in FIG. 1 will be omitted according to necessity.

(First Embodiment)

Figure 3A:
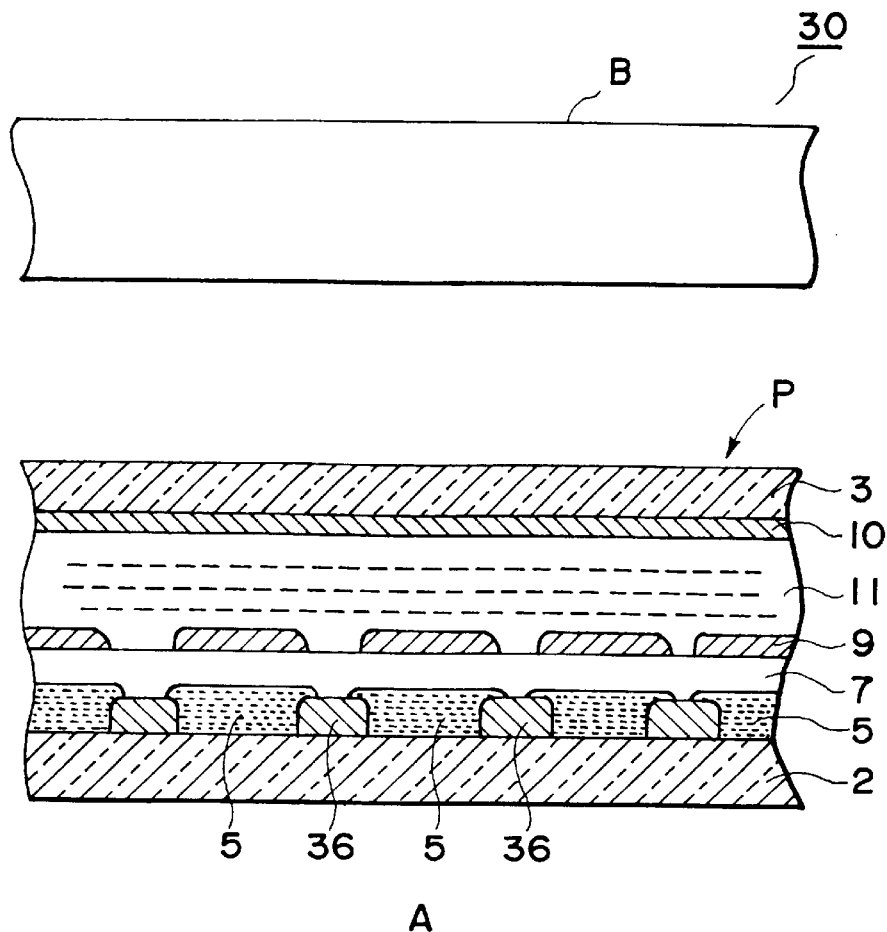
FIG. 3A is a schematic sectional view showing a structure of a liquid crystal display apparatus including a masking member adopted in first and second embodiments (appearing hereinafter) according to the present invention and FIG. 3B is a schematic sectional view of an enlarged masking member portion of the display apparatus shown in FIG. 3A.

FIG. 3A is a schematic sectional view of a color liquid crystal display apparatus according to First embodiment as an example of the display apparatus of the present invention.

Referring to FIG. 3A, a color liquid crystal display apparatus 30 includes a liquid crystal display panel P and a backlight unit or device (as illumination means) B.

The display panel P includes a pair of oppositely disposed transparent substrates consisting of a first (upper) substrate 3 and a second (lower) substrate 2 disposed substantially parallel with each other, a plurality of color filters (color filter segments) 5, a masking film (masking member) 36, a protective film 7, a plurality of transparent electrodes 9, a plurality of transparent electrodes 10, and a liquid crystal 11. On the transparent electrodes 9 and 10, an alignment control layer (not shown) is disposed, respectively.

In this embodiment, each of the transparent substrates 2 and 3 is made of a 1 mm-thick glass plate, both surfaces of which are polished ("BSL7", mfd. by Ohara Kogaku Garasu K. K.; n=ca. 1.52).

Figure 3B:
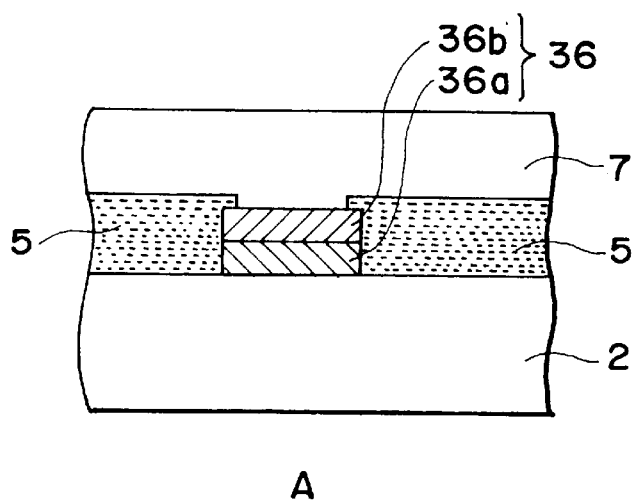

FIG. 3B is partially enlarged view for illustrating a positional relationship between the color filters 5 and the masking member 36.

Referring to FIG. 3B, on the surface of the second substrate 2, the color filters 5 of primary colors (R, G and B) are disposed in alignment with pixels (each at an intersection of the transparent electrodes 9 and 10) so as to fill the spacings between segments of the masking film 36. On the color filters 5 and the masking film 36, the protective layer 7 is disposed.

The masking film 36 has a lamination structure including a first layer 36a disposed on the second substrate 2 and a second layer 36b disposed on the first layer 36a so as to coat the layer 36a. The first and second layers 36a and 36b respectively comprise an alloy of Mo and Ta (Mo—Ta alloy) containing carbon (C) and oxygen (O).

In this embodiment, a 2400 Å-thick masking film 36 including a 600 Å-thick first layer 36a and a 1800 Å-thick second layer 36b was formed through a sputtering step and a patterning step in the following manner.

In the sputtering step, a sufficiently washed second substrate 2 was set in a prescribed position within a bath-type magnetron sputtering apparatus (DC discharge) using an embodiment gas comprising a mixture gas of Ar and $CO_2$ and a target comprising an Mo—Ta alloy (Mo:Ta=85 wt. %:15 wt. %) (hereinbelow, simply referred to as "Mo—Ta (alloy)"). The second substrate 2 was subjected to reactive sputtering by using the above apparatus under the following conditions.

| Condition | First layer | Second layer |
|---|---|---|
| Target | Mo-Ta | Mo-Ta |
| Power (W) | 190 | 730 |
| Gas pressure (mTorr) | 5.0 | 5.0 |
| Flow ratio (Ar:$CO_2$) | 50:20 | 50:20 |

-continued

| Condition | First layer | Second layer |
| --- | --- | --- |
| Deposition rate (Å/min) | 166 | 485 |

As shown above, in this embodiment, by changing the sputtering power with respect to the first layer 36a and the second layer 36b of the masking film 36, optical constants including refractive indices $n_1$ (1st layer) and $n_2$ (2nd layer) and extinction coefficients $k_1$ (1st layer) and $k_2$ (2nd layer) were controlled to have appropriate values, respectively.

The thus-formed masking film 36 having a lamination structure (36a and 36b) was subjected to patterning and etching through by a photolithographic process so as to leave spacings. In the etching step, a mixture etchant ($H_3PO_4$, $HNO_3$ and $CH_3COOH$) was used.

Then, at the spacings, the color filters 5 (R, G and B; pigment-dispersion type) were formed. On the color filters 5 and the masking film 36, the protection layer 17 (e.g., comprising polyamide resin, siloxane polymers and silica; polyamide resin was used in this embodiment) and the transparent electrodes 9 were formed in this order as shown in FIG. 3A. Further, an alignment control film (not shown) was formed on the transparent electrodes 9 to prepare an electrode plate. On the other hand, the first substrate 3 was successively coated with the transparent electrodes 10 and an alignment control film (not shown) to prepare another electrode plate. The thus-treated first and second substrates 3 and 2 (two electrode plate) were applied to each other so as to leave a prescribed cell gap, which was then filled with the liquid crystal 11 to prepare the liquid crystal display panel P.

In this embodiment, measurement of the optical constants ($n_1$, $n_2$, $k_1$ and $k_2$) of the first and second layers 36a and 36b of the masking film 36 was performed before the patterning step by using an ellipsometer. The results are shown below.

| Wavelength (nm) | <1st layer> | | <2nd layer> | |
| --- | --- | --- | --- | --- |
| | n1 | k1 | n2 | k2 |
| 400 | 2.162 | 0.236 | 2.578 | 1.234 |
| 500 | — | — | 2.725 | 1.315 |
| 550 | 2.038 | 0.383 | — | — |
| 600 | — | — | 2.873 | 1.336 |
| 700 | 2.099 | 0.370 | 2.997 | 1.369 |

Further, in order to evaluate a reflectance-reducing property to external light of the making film 36, a reflectance thereof was measured before the patterning step by using a reflectometer ("V-3000", mfd. by K. K. Hitachi Seisakusho).

Figure 4:
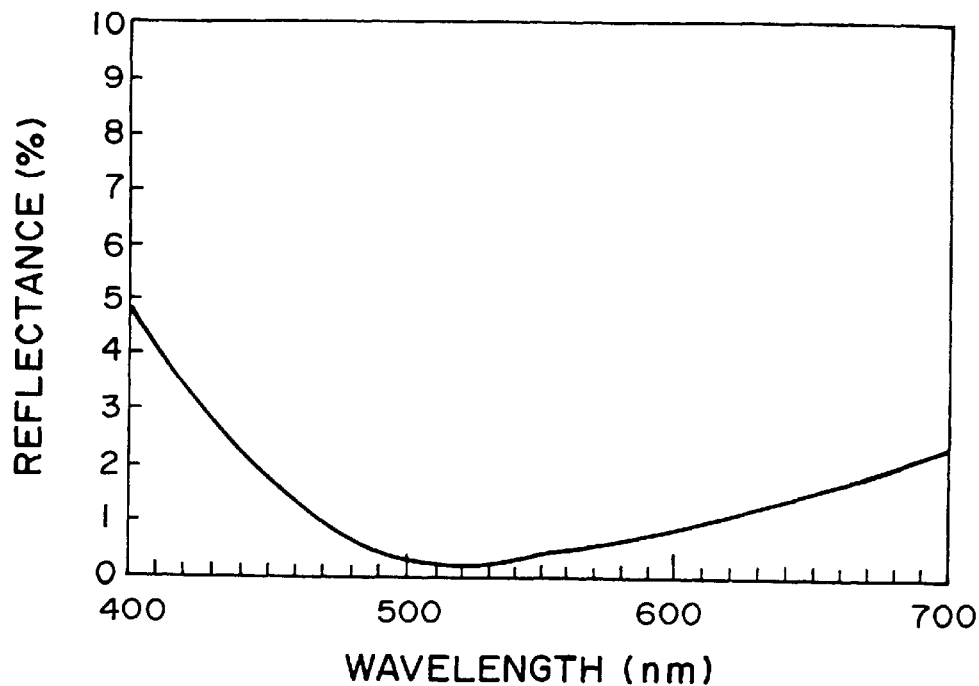
FIG. 4 is a graph showing a relationship between a reflectance and a wavelength as an effect of the first embodiment.

As a result, the masking film 36 showed a reflectance of at most 5% in a visible region of 400–700 nm, particularly at most 1% in a region of 500–600 nm as shown in FIG. 4.

In this embodiment, when the above-prepared liquid crystal panel P is driven by supplying a prescribed signal to the transparent electrodes 9 and 10 while illuminating it with light from the backlight unit, the liquid crystal 11 is caused to effect switching for each pixel, whereby transmitted light provides various data or information in combination with the color filters 5 (through which the light passes).

In this embodiment, the first layer 36a is controlled to have the optical constants ($n_1$ and $k_1$) in the above ranges, whereby the reflectance is lowered to a practically acceptable level due to a reflectance-reducing function of the first layer 36a. Accordingly, even when the display apparatus 30 is used in a light place (e.g., outdoors) and external light from a viewer side A (shown in FIGS. 3A and 3B) falling on the apparatus, the incident (external) light is less reflected at the surface of the first layer 36a. Further, the second layer 36b principally functioning as a light-interrupting layer is controlled to have the optical constants ($n_2$ and $k_2$) in the above ranges satisfying the relationships $n_1 < n_2$ and $k_1 < k_2$ at an identical wavelength in a visible region (herein, the relationships of the optical constants means those at an identical wavelength in a visible region), so that it is possible to improve a reflectance-reducing property and a light-interrupting property of the masking film 36 at the same time and balanced with each other.

According to this embodiment, each of the first and second layers 36a and 36b of the masking film 36 comprises a layer of a metal compound containing carbon, oxygen and a metal element (Mo—Ta alloy), so that the layers 36a and 36b have physical and chemical properties similar to each other, thus showing a comparable degree of etching in the patterning step by the photographic process. As a result, the layers 36a and 36b are not readily caused to have uneven (stepwise) side surfaces as a whole even when the masking film 36 has a lamination structure, thus resulting in a liquid crystal display apparatus with a high quality and a high accuracy.

Further, the first and second layers 36a and 36b are formed by sputtering with a common ambient gas (Ar and $CO_2$) and sputtering target (Mo—Ta (15 wt. %)), whereby replacement of ambient gases and sputtering targets can be omitted, thus reducing production time and cost. Moreover, the omission of replacement of ambient gases also allows the use of an inexpensive batch-type sputtering apparatus instead of an expensive continuous-type sputtering apparatus, thus simplifying production steps in additive to reduction of a production cost.

In this embodiment, by the use of the mixture gas of Ar and $CO_2$ (as ambient gas), it is unnecessary to use a metal oxide-sputtering target, thus obviating difficulties, such as a lower sputtering rate and a target breakage (or a crack in the target).

In this embodiment, the masking film 36 is designed to have a lamination structure including the first layer 36a principally effective in decreasing a degree of reflection of external light and the second layer 36b principally effective in suppressing light transmission (i.e., improving the light-interrupting property) by controlling the sputtering conditions so as to provide appropriate optical constants $n_1$, $n_2$, $k_1$ and $k_2$, so that it is possible to enhance a display quality of the liquid crystal display apparatus 30. More specifically, in this embodiment, the refractive index $n_1$ and extinction coefficient $k_1$ of the first layer 36a are set to have the above-mentioned values, respectively, whereby external light reflection is reduced even when the display apparatus 30 is used in a bright place, such as outdoors (as shown in FIG. 4), thus maintaining a good display quality. Further, the refractive index $n_2$ and extinction coefficient $k_2$ of the second layer 36b are set to have the above-mentioned values, respectively, the resultant masking film 36 can suppress transmission of backlight and external light although the film 36 is a thin film, thus being excellent in a light-interrupting property. As a result, it is possible to provide a color liquid crystal apparatus 30 capable of preventing unnecessary color mixing of primary colors and improving a contrast and its display quality. Moreover, the above-mentioned optical constants (refractive indices and extinction coefficients) $n_1$, $n_2$, $k_1$ and $k_2$ can readily be controlled with accuracy by adjusting the sputtering power since the reactive sputtering using the Mo—Ta alloy target and the mixture gas of Ar and $CO_2$ is performed in the sputtering step for forming the masking film 36, so that it is possible to realize the display apparatus excellent in display quality as described above and free from malfunction. Simultaneously, it becomes possible to form the masking film 36 with a stable quality to improve a yield of product, thus reducing production cost. Further, in case where a metal, such as Cr is used, disposal of waste solution therefor requires a larger cost but in this embodiment, the Mo—Ta alloy is used, thus resulting in a smaller cost of the waste solution disposal.

(Second Embodiment)

A color liquid crystal display apparatus 30 according to this embodiment has a structure shown in FIGS. 3A and 3B identical to that of the First embodiment except that a first layer 36a of a masking film 36 is formed in the following manner.

More specifically, a 600 Å-thick first layer 36a was formed on a transparent substrate by reactive sputtering in the same manner as in the First embodiment under the following conditions.

| Condition | First layer (36a) |
| --- | --- |
| Target | Mo-Ta |
| Power (W) | 340 |
| Gas pressure (mTorr) | 5.0 |
| Flow rate (Ar:$CO_2$) | 50:20 |
| Deposition rate (Å/min) | 214 |

The thus-formed first layer 36a of the masking film 36 provided the following refractive index $n_1$ and extinction coefficient $k_1$ as measured by using an ellipsometer in the same manner as in First embodiment.

| | <1st layer> | |
| --- | --- | --- |
| Wavelength (nm) | n1 | k1 |
| 400 | 2.230 | 0.453 |
| 550 | 2.210 | 0.568 |
| 700 | 2.277 | 0.552 |

These optical constants $n_1$ and $k_1$ were set to satisfy the following relationship:

$n_1 < n_2$ and $k_1 < k_2$, wherein $n_2$ and $k_2$ represent a refractive index and extinction coefficient of a second layer 36b (formed in the same manner as in the First embodiment).

Figure 5:
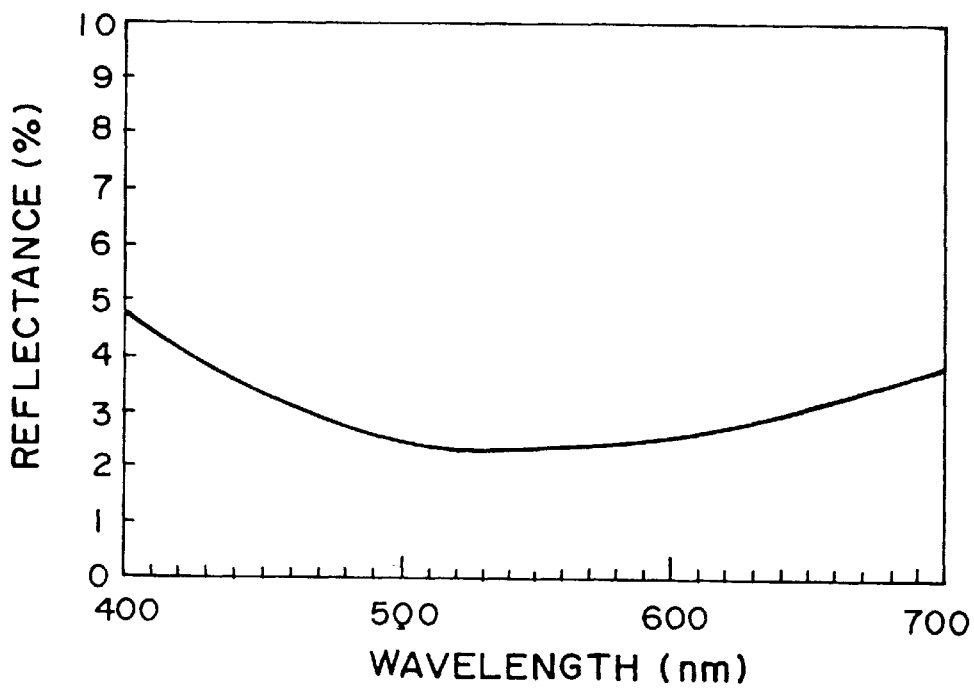
FIG. 5 is a graph showing a relationship between a reflectance and a wavelength as an effect of the second embodiment.

Further, the masking film 36 showed a reflectance characteristic as shown in FIG. 5 (measured in the same manner as in the First embodiment). As a result, the masking film 36 showed a reflectance of at most 5% in a visible region of 400–700 nm.

According to this embodiment, the above-described advantageous effects in the First embodiment are similarly brought about principally by setting the optical constants $n_1$, $n_2$, $k_1$ and $k_2$ of the first and second layers 36a and 36b constituting the masking film 36 in appropriate ranges.

(Third Embodiment)

Figure 6A:
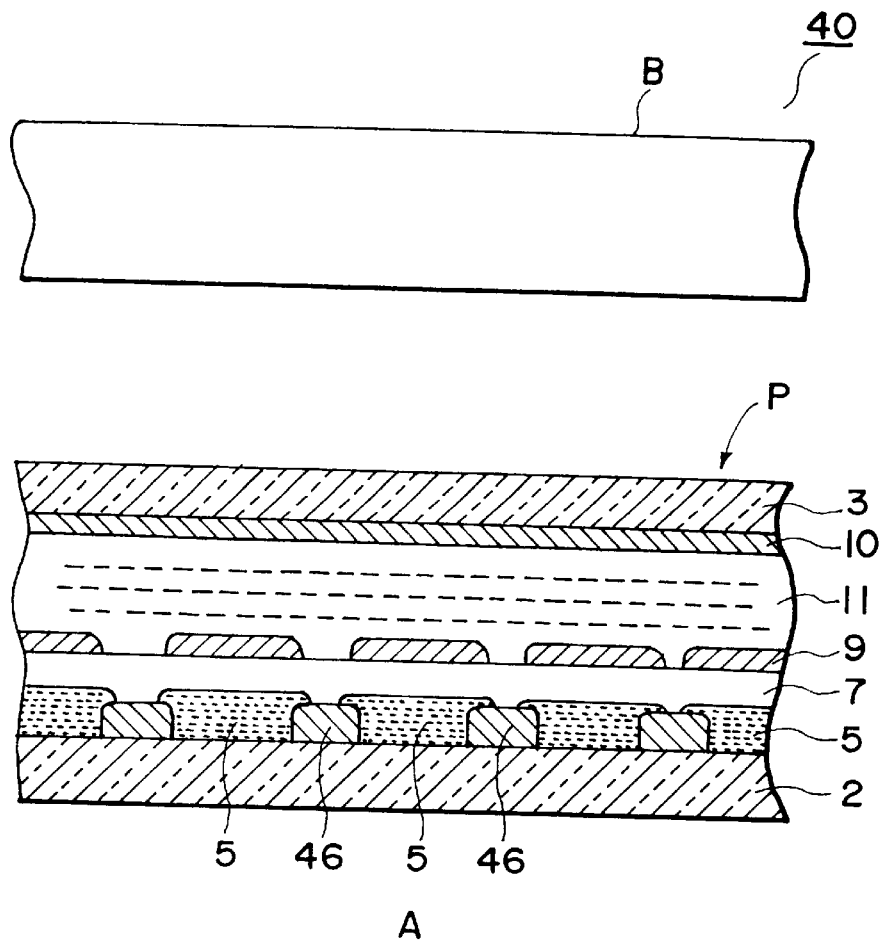
FIG. 6A is a schematic sectional view showing a structure of a liquid crystal display apparatus including a masking member adopted in a third embodiment (appearing hereinafter) according to the present invention and FIG. 6B is a schematic sectional view of an enlarged masking member portion of the display apparatus shown in FIG. 6A.
Figure 6B:
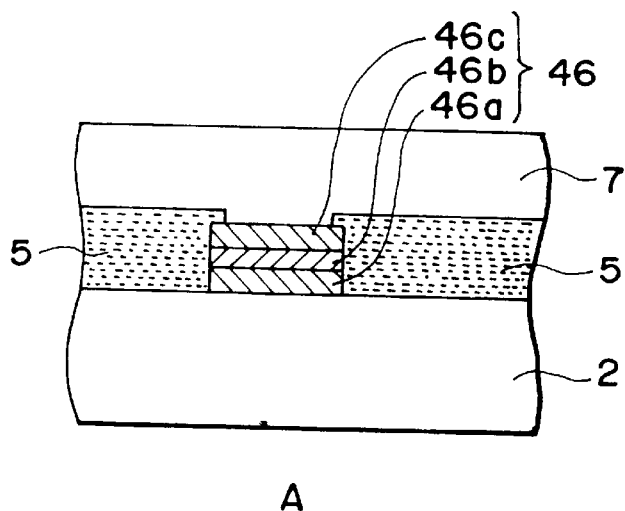

A color liquid crystal display apparatus 40 according to this embodiment has a structure shown in FIGS. 6A and 6B identical to that of the First embodiment (FIGS. 3A and 3B) except for including a masking film 46.

More specifically, a 3000 Å-thick masking film 46 including a 600 Å-thick first layer 46a, a 1800 Å-thick second layer 46b and a 600 Å-thick third layer 46c (as shown in FIG. 6B) was formed on a transparent substrate by reactive sputtering in the same manner as in the First embodiment under the following conditions.

| Condition | 1st layer | 2nd layer | 3rd layer |
| --- | --- | --- | --- |
| Target | Mo-Ta | Mo-Ta | Mo-Ta |
| Power (W) | 480 | 980 | 480 |
| Gas pressure (mTorr) | 5.0 | 5.0 | 5.0 |
| Flow rate (Ar:$O_2$) | 50:10 | 50:10 | 50:10 |
| Deposition rate (Å/min) | 245 | 510 | 245 |

The thus-formed first to third layers 46a, 46b and 46c of the masking film 36 provided the following refractive indices $n_1$, $n_2$ and $n_3$ and extinction coefficients $k_1$, $k_2$ and $k_3$ as measured by using an ellipsometer in the same manner as in the First embodiment.

| | <1st and 3rd layers> | | <2nd layer> | |
| --- | --- | --- | --- | --- |
| Wavelength (nm) | n1, n3 | k1, k3 | n2 | k2 |
| 400 | 2.298 | 0.667 | 2.755 | 2.053 |
| 550 | 2.382 | 0.753 | 2.992 | 2.444 |
| 700 | 2.456 | 0.785 | 3.357 | 2.581 |

These optical constants $n_1$, $n_2$, $n_3$, $k_1$, $k_2$ and $k_3$ were set to satisfy the following relationship:

$n_1 < n_2$, $n_3 < n_2$ and $k_1 < k_2$ and $k_3 < k_2$.

Further, the masking film 46 showed a reflectance characteristic as shown in FIG. 7 (measured in the same manner as in the First embodiment). As a result, the masking film 46 showed a reflectance of about 3.2–5.2% in a visible region of 400–700 nm.

According to this embodiment, the above-described advantageous effects in the First embodiment are similarly brought about principally by setting the optical constants $n_1$, $n_2$, $n_3$, $k_1$, $k_2$ and $k_3$ of the first to third layers 46a, 46b and 46c constituting the masking film 46 in appropriate ranges.

Particularly, in this embodiment, the optical constants $n_2$ and $k_2$ of the second layer 46b of the masking film 46 are set to be larger than the optical constants $n_1$, $n_3$, $k_1$ and $k_3$, respectively. As a result, reflection of a backlight within the display apparatus is remarkably suppressed. In case where a liquid crystal display apparatus including a first substrate provided with a switching element (e.g., TFT) but not provided with a masking film and a second substrate with a masking film is used, it is possible to prevent a malfunction (switching failure) of the switching element caused by the influence of, e.g., the backlight (e.g., carriers generated by reflected light).

(Fourth Embodiment)

A color liquid crystal display apparatus 50 according to this embodiment has a structure shown in FIGS. 8A and 8B identical to that of the First embodiment (FIGS. 3A and 3B) except for including a masking film 56.

More specifically, a 1800 Å-thick masking film 56 was formed on a transparent substrate by reactive sputtering in the same manner as in the First embodiment under the following conditions while increasing a sputtering powder at a rate of about 350 W/min.

| Condition | First layer (36a) |
|---|---|
| Target | Mo-Ta |
| Power (W) | 190–900 |
| Gas pressure (mTorr) | 5.0 |
| Flow rate (Ar:CO$_2$) | 60:20 |

The thus-formed masking film 56 was controlled to provided a refractive index characteristic and extinction coefficient characteristic each continuously increasing its value from the transparent substrate side (minimum value at the boundary with the transparent substrate) to the upper layer (protective layer) side (maximum value at the boundary with the protective layer).

Figure 9:
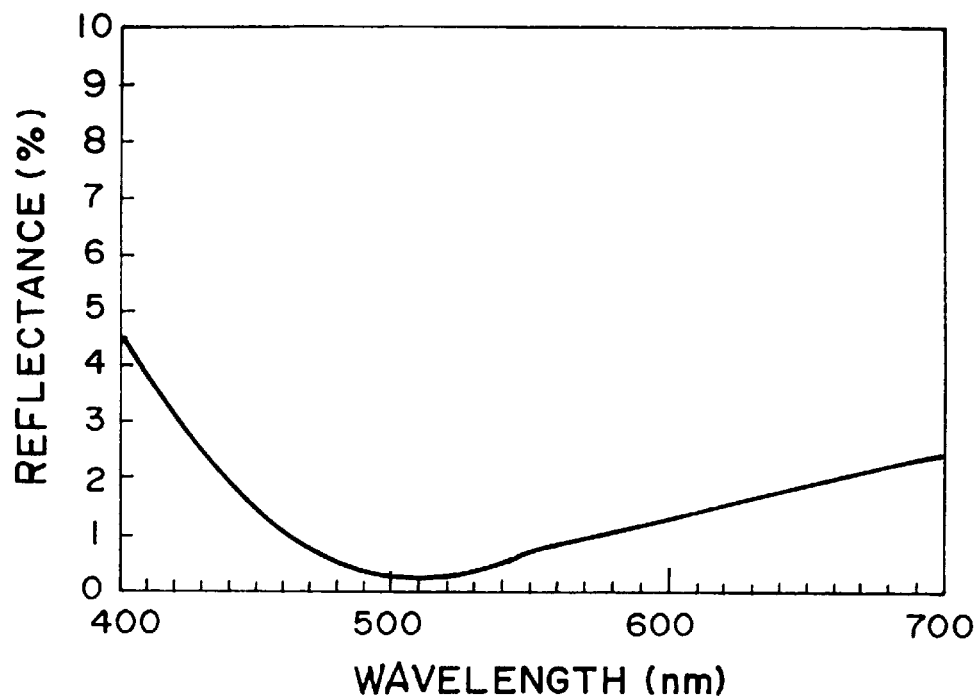
FIG. 9 is a graph showing a relationship between a reflectance and a wavelength as an effect of the fourth embodiment.

Further, the masking film 56 showed a reflectance characteristic as shown in FIG. 9 (measured in the same manner as in the First embodiment). As a result, the masking film 56 showed a reflectance of at most 5% in a visible region of 400–700 nm, particularly at most 2% in a region of 440–660 nm.

According to this embodiment, the above-described advantageous effects in the First embodiment are similarly attained principally by setting the optical constants n and k of the masking film 56 in appropriate ranges and continuously changing (increasing) their values in its thickness direction.

As described in the First to Fourth embodiments of the present invention, each of the layers (36a, 36b, 46a, 46b, 46c and 56) constituting the masking films (36, 46 and 56) comprises an identical layer of a metal compound containing an Mo—Ta alloy as a metal element and containing both C and O (First, Second and Fourth embodiments) or only O (Third embodiment) as a compounding element.

In these embodiments, the respective layers constituting the masking film may independently comprise another metal element, such as Mo or an Mo alloy other than Mo—Ta or another compounding element, such as only C. More specifically, the masking film may have a lamination structure including two layers comprising a combination of, e.g., an O-containing layer and a C,O-containing layer (a layer containing C and O), an O-containing layer and a C-containing layer, or a C-containing layer and a C,O-containing layer, and including three layers comprising a combination selected from an O-containing layer, a C-containing layer and a C,O-containing layer, thus suppressing an occurrence of an uneven side surfaces of the (laminated) masking film. The masking film may have a lamination structure comprising four or more layers.

Further, in the above embodiments, as an ambient gas for the sputtering step, a mixture gas of Ar and CO$_2$ is principally used but may contain another gas, such as CH$_2$, CH$_4$, CO or O$_2$, instead of CO$_2$.

In the above-mentioned Third embodiment, the optical constants $n_1$, $n_2$, $n_3$, $k_1$, $k_2$ and $k_3$ may appropriately be set so that $n_1$ is not the largest value among $n_1$, $n_2$ and $n_3$, preferably $n_1 < n_2$ and $k_1$ is not the largest value among $k_1$, $k_2$ and $k_3$, preferably $k_1 < k_2$.

(Fifth Embodiment)

A color liquid crystal display apparatus 60 partially shown in FIG. 10 according to this embodiment has a structure identical to that of the First embodiment shown in FIGS. 3A and 3B except that a masking film 66 is used instead of the masking film 36 and is formed in the following manner.

Figure 10:
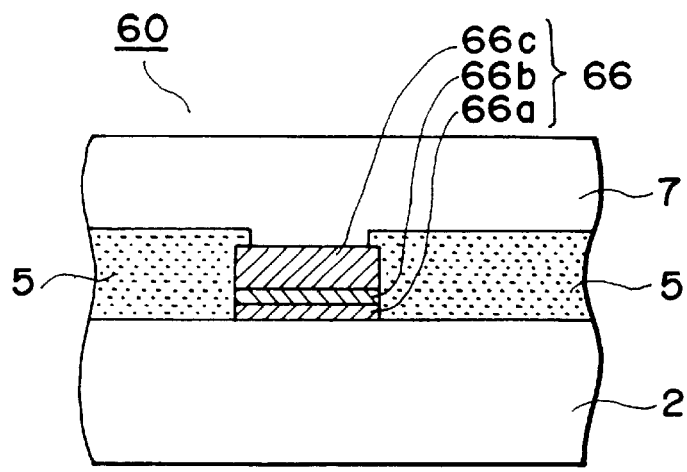
FIG. 10 is a schematic sectional view of a masking member portion of a liquid crystal display apparatus used in fifth and sixth embodiments (appearing hereinafter) according to the present invention.

More specifically, a 1500 Å-thick masking film 66 including a 200 Å-thick first layer 66a, a 300 Å-thick second layer 66b and a 1000 Å-thick third layer 66c (as shown in FIG. 10) was formed on a transparent substrate 2 by reactive sputtering in the same manner as in the First embodiment under the following conditions.

| Condition | 1st layer | 2nd layer | 3rd layer |
|---|---|---|---|
| Target | Mo-Ta | Al-Ta | Mo-Ta |
| Power (W) | 340 | 660 | 1200 |
| Gas pressure (mTorr) | 5.0 | 5.0 | 5.0 |
| Flow rate (Ar:CO$_2$) | 50:10 | 50:10 | 50:10 |
| Deposition rate (Å/min) | 310 | 120 | 960 |

In the embodiment, the sputtering target of Mo—Ta alloy for forming the first layer 66a was replaced by the sputtering target of Al for forming the second layer 66b and then by the sputtering target of Mo—Ta alloy for forming the third layer 66c.

The thus-formed first to third layers 66a, 66a and 66c of the masking film 66 provided the following refractive index $n_1$, $n_2$ and $n_3$ and extinction coefficients $k_1$, $k_2$ and $k_3$ as measured by using an ellipsometer in the same manner as in the First embodiment.

| Wavelength (nm) | | |
|---|---|---|
| <1st layer> | | |
| | n1 | k1 |
| 400 | 2.474 | 1.160 |
| 550 | 2.703 | 1.267 |
| 700 | 2.882 | 1.249 |
| <2nd layer> | | |
| | n2 | k2 |
| 400 | 1.644 | 0 |
| 550 | 1.634 | 0 |
| 700 | 1.629 | 0 |
| <3rd layer> | | |
| | n3 | k3 |
| 400 | 2.934 | 2.428 |
| 550 | 3.081 | 2.864 |
| 700 | 3.499 | 3.063 |

These optical constants $n_1$, $n_2$, $n_3$, $k_1$, $k_2$ and $k_3$ were set to satisfy the following relationship:

$$n_2 < n_1 < n_3 \text{ and } k_2 < k_1 < k_3,$$

Further, the masking film 66 showed a reflectance characteristic as shown in FIG. 11 (measured in the same manner as in First embodiment). As a result, the masking film 66 showed a reflectance of about 2.5–4.7% in a visible region of 400–700 nm.

In this embodiment, when the above-prepared liquid crystal panel is driven by supplying a prescribed signal to the transparent electrodes 9 and 10 while illuminating it with light from the backlight unit, the liquid crystal 11 is caused to effect switching for each pixel, whereby transmitted light provides various data or information in combination with the color filters 5 (through which the light passes).

In this embodiment, the first to third layers 66a, 66b and 66c are controlled to have the optical constants ($n_1$, $n_2$, $n_3$, $k_1$, $k_2$ and $k_3$) in the above ranges satisfying the relationships $n_2<n_1<n_3$ and $k_2<k_1<k_3$, whereby the reflectance is lowered to a practically acceptable level. Accordingly, even when the display apparatus 60 is used in a light place (e.g., outdoors) and external light from a viewer side A (shown in FIG. 10) falling on the apparatus, the incident (external) light is less reflected at the surface of the first layer 66a.

According to this embodiment, each of the first to third layers 66a, 66b and 66c of the masking film 66 comprises a layer of a metal compound containing carbon, oxygen and a metal element (Mo—Ta alloy or Al), so that all the layers 66a, 66b and 66c show a comparable degree of etching in the patterning step by the photographic process. As a result, the layers 66a, 66b and 66c are not readily caused to have uneven (stepwise) side surfaces as a whole although the masking film 66 has a lamination structure, thus resulting in a liquid crystal display apparatus with a high quality and a high accuracy.

Further, the first to third layers 66a, 66b and 66c are formed by sputtering with a common ambient gas (Ar and $CO_2$), whereby replacement of ambient gases can be omitted, thus reducing production time and cost. Moreover, the omission of replacement of ambient gases also allows the use of an inexpensive batch-type sputtering apparatus instead of an expensive continuous-type sputtering apparatus, thus simplifying production steps in additive to reduction of production costs.

In this embodiment, by the use of the mixture gas of Ar and $CO_2$ (as ambient gas), it is unnecessary to use a metal oxide-sputtering target, thus obviating difficulties, such as a lower sputtering rate and a target breakage (or a crack in the target).

In this embodiment, the masking film 66 is designed to have a lamination structure including the first layer 66a, the second layer 66b and the third layer 66c by controlling the sputtering conditions so as to provide appropriate optical constants $n_1$, $n_2$, $n_3$, $k_1$, $k_2$ and $k_3$, so that it is possible to maintain a good display quality of the liquid crystal display apparatus 60 through reduction of a degree of external light reflection even when the display apparatus 60 is used in a bright place, such as outdoors (as shown in FIG. 11).

Further, the above-mentioned optical constants (refractive indices and extinction coefficients) $n_1$, $n_2$, $n_3$, $k_1$, $k_2$ and $k_3$ can readily be controlled by principally adjusting the sputtering power or gas flow ratio ($Ar:CO_2$) since the reactive sputtering using the Mo—Ta alloy target or the Al target and the mixture gas of Ar and $CO_2$ is performed in the sputtering step for forming the masking film 66. Moreover, it is possible to form the masking film 66 with a table quality even in mass production due to high reproducibility and stability of the sputtering conditions and optical constants. Further, in case where a metal, such as Cr is used, disposal of waste solution therefor requires a larger cost but in this embodiment, the Mo—Ta alloy or Al is used, thus resulting in a smaller cost of the waste solution disposal.

(Sixth Embodiment)

A color liquid crystal display apparatus according to this embodiment has a structure identical to that of the Fifth embodiment shown in FIGS. 10, 3A and 3B except that a second layer 66a of a masking film 66 is formed in the following manner.

More specifically, a 300 Å-thick second layer was formed on a transparent substrate by reactive sputtering in the same manner as in the Fifth embodiment under the following conditions.

| Condition | Second layer |
|---|---|
| Target | Si |
| Power (W) | 600 |
| Gas pressure (mTorr) | 5.0 |
| Flow rate ($Ar:CO_2$) | 50:10 |
| Deposition rate (Å/min) | 85 |

In this embodiment, a first layer 66a and a third layer 66c were formed in the same manner as in the Fifth embodiment.

The thus-formed first layer 66a of the masking film 66 provided the following refractive index $n_2$ and extinction coefficient $k_2$ as measured by using an ellipsometer in the same manner as in the Fifth embodiment.

| | <2nd layer> | |
|---|---|---|
| Wavelength (nm) | n2 | k2 |
| 400 | 1.47 | 0 |
| 550 | 1.46 | 0 |
| 700 | 1.46 | 0 |

These optical constants $n_1$ and $k_1$ were set to satisfy the following relationship:

$$n_2<n_1<n_3 \text{ and } k_2<k_1<k_3.$$

Further, the masking film 66 showed a reflectance characteristic as shown in FIG. 12 (measured in the same manner as in Fifth embodiment). As a result, the masking film 66 showed a reflectance of about 2.3–3.7% in a visible region of 400–700 nm.

According to this embodiment, the above-described advantageous effects in the Fifth embodiment are similarly brought about principally by setting the optical constants $n_1$, $n_2$, $n_3$, $k_1$, $k_2$ and $k_3$ of the first to third layers 66a, 66b and 66c constituting the masking film 36 in appropriate ranges. Further, the second layer 66b containing Si, C and O does not require a larger cost of disposal of waste solution therefor compared with the conventional layer containing, e.g., Cr.

As described in the Fifth and Sixth embodiments of the present invention, each of the first to third layers (66a, 66b, and 66c) constituting the masking film 66 comprises a layer of a metal compound containing both C and O.

In these embodiments, the respective (first to third) layers constituting the masking film may independently comprise another metal element, such as Mo or an Mo alloy instead of Mo—Ta and/or other metal elements other than Al and Si or independently comprise another compounding element, such as only O or C. More specifically, the masking film may have a lamination structure including three layers comprising a combination appropriately selected from an O-containing layer, a C-containing layer and a C,O-containing layer, thus suppressing an occurrence of uneven side surfaces of the (laminated) masking film. For example, the masking film may have a lamination structure including first and third O-containing layers and a second C,O-containing layers and including a first O-containing layer, a second C,O-containing layer and a third C-containing layer.

Further, in the above (Fifth and Sixth) embodiments, as an ambient gas for the sputtering step, a mixture gas of Ar and $CO_2$ is used but may contain another gas, such as $CH_4$ and/or $O_2$, instead of $CO_2$.

In the above-mentioned Fifth and Sixth embodiments, the optical constants $n_1$, $n_2$, $n_3$, $k_1$, $k_2$ and $k_3$ may appropriately be set so that $n_1$ is not the largest value among $n_1$, $n_2$ and $n_3$ and $k_1$ is not the largest value among $k_1$, $k_2$ and $k_3$. More specifically, the refractive indices $n_1$, $n_2$ and $n_3$ and the extinction coefficients may satisfy the following relationships.

$$n_3 < n_1 < n_2 \text{ and } k_3 < k_1 < k_2,$$

$$n_1 < n_3 < n_1 \text{ and } k_1 < k_3 < k_2,$$

$$n_2 < n_1 < n_3 \text{ and } k_2 < k_1 < k_3,$$

$$n_1 < n_2 < n_3 \text{ and } k_1 < k_2 < k_3.$$

(Seventh Embodiment)

Figure 13:
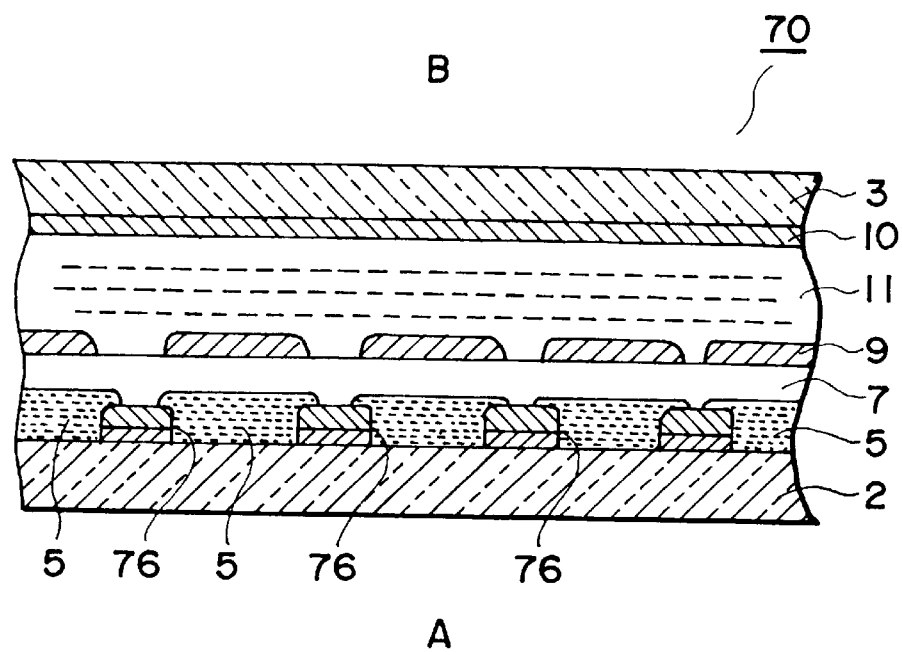
FIG. 13 is a schematic sectional view of a liquid crystal display panel (device) adopted in a seventh embodiment (appearing hereinafter) according to the present invention.

FIG. 13 is a schematic sectional view of a color liquid crystal display apparatus according to a Seventh embodiment as an example of the display apparatus of the present invention.

Referring to FIG. 13, a color liquid crystal display apparatus 70 includes a liquid crystal display panel P and a backlight unit or device (as illumination means) B.

The display panel P includes a pair of oppositely disposed transparent substrates consisting of a first (upper) substrate 3 and a second (lower) substrate 2 disposed substantially parallel with each other, a plurality of color filters (color filter segments) 5, a masking film (masking member) 76, a protective film 7, a plurality of transparent electrodes 9, a plurality of transparent electrodes 10, and a liquid crystal 11. On the transparent electrodes 9 and 10, an alignment control layer (not shown) is disposed, respectively.

In this embodiment, each of the transparent substrates 2 and 3 is made of a 1 mm-thick blue plate glass (n=ca. 1.52) both surfaces of which are polished (a 1 mm-thick glass plate "#7509", mfd. by Corning Glass Works; (n=ca. 1.52) may also be used).

Figure 14:
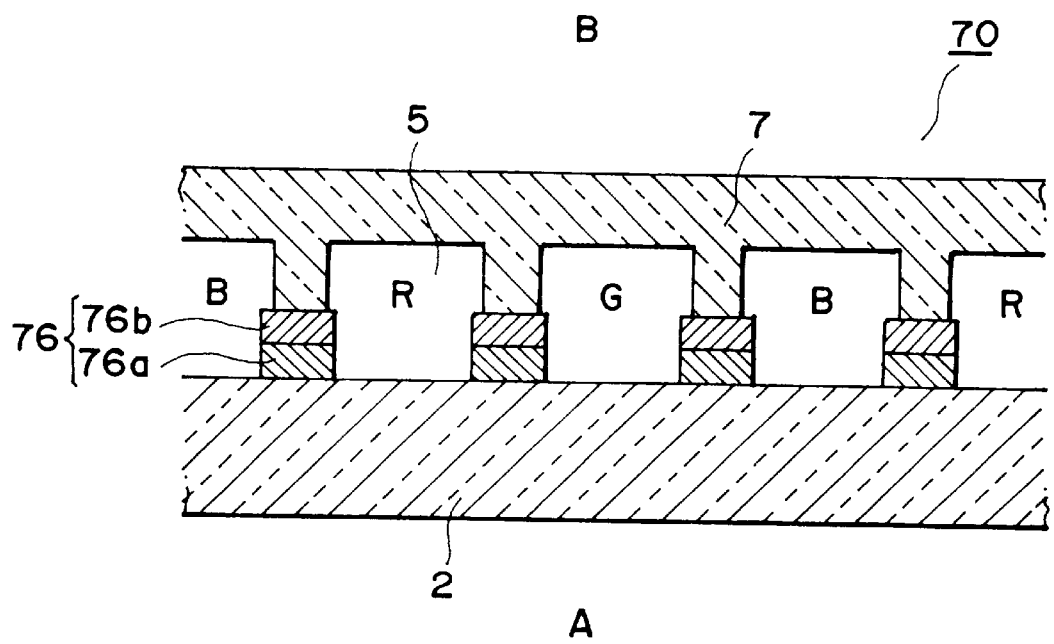
FIG. 14 is a schematic sectional view of an enlarged masking member portion adopted in the seventh embodiment.

FIG. 14 is partially enlarged view for illustrating a positional relationship between the color filters 5 and the masking member 76.

Referring to FIG. 14, on the surface of the second substrate 2, the color filters 5 of primary colors (R, G and B) are disposed in alignment with pixels (each at an intersection of the transparent electrodes 9 and 10) so as to fill the spacings between segments of the masking film 76. On the color filters 5 and the masking film 76, the protective layer 7 is disposed.

The masking film 76 has a lamination structure including a first layer 76a disposed on the second substrate 2 and a second layer 76b disposed on the first layer 76a so as to coat the layer 76a. The first layer 76a comprises an alloy of Mo and Ta (Mo—Ta alloy) containing carbon (C) and oxygen (O) and the second layer 76b comprises an Mo—Ta alloy.

In this embodiment, a 1460 Å-thick masking film 76 including a 635 Å-thick first layer 76a and an 825 Å-thick second layer 76b was formed through a sputtering step and a patterning step in the following manner.

In the sputtering step, a sufficiently washed second substrate 2 was set in a prescribed position within a bath-type magnetron sputtering apparatus (DC discharge) using an embodiment gas comprising a mixture gas of Ar and $CO_2$ and a target comprising an Mo—Ta alloy (Mo:Ta=85 wt. %:15 wt. %). The second substrate 2 was subjected to reactive sputtering by using the above apparatus under the following conditions.

| Condition | First layer | Second layer |
|---|---|---|
| Target | Mo-Ta | Mo-Ta |
| Power (W/cm$^2$) | 4.3 | 11.0 |
| Gas pressure (Pa) | 0.67 | 0.67 |
| Flow ratio (Ar:$CO_2$) | 50:30 | 50 (Ar) |
| Deposition rate (Å/min) | 280 | 680 |

In this embodiment, the first layer 76a had an oxygen content and a carbon content each being uniform in its thickness direction.

The thus-formed masking film 76 having a lamination structure (76a and 76b) was subjected to patterning (etching) by a photolithographic process so as to leave spacings. In the etching step, a mixture etchant ($H_3PO_4$, $HNO_3$ and $CH_3COOH$) was used.

Then, at the spacings, the color filters 5 (R, G and B; pigment-dispersion type) were formed. On the color filters 5 and the masking film 76, the protection layer 17 (e.g., comprising polyamide resin, siloxane polymers and silica; polyamide resin was used in this embodiment) and the transparent electrodes 9 were formed in this order as shown in FIG. 13. Further, an alignment control film (not shown) was formed on the transparent electrodes 9. On the other hand, the first substrate 3 was successively coated with the transparent electrodes 10 and an alignment control film (not shown). The thus-treated first and second substrates 3 and 2 were applied to each other so as to leave a prescribed cell gap, which was then filled with the liquid crystal 11 to prepare the liquid crystal display panel P.

In this embodiment, measurement of the optical constants ($n_1$, $n_2$, $k_1$ and $k_2$) of the first and second layers 76a and 76b of the masking film 76 was performed before the patterning step by using an ellipsometer. The results are shown below.

| | <1st layer> | | <2nd layer> | |
|---|---|---|---|---|
| Wavelength (nm) | n1 | k1 | n2 | k2 |
| 550 | 2.034 | 0.319 | 3.319 | 3.703 |

Further, in order to evaluate a reflectance-reducing property to external light of the making film 76, a reflectance thereof was measured before the patterning step by using a reflectometer ("V-3000", mfd. by K. K. Hitachi Seisakusho).

Figure 15:
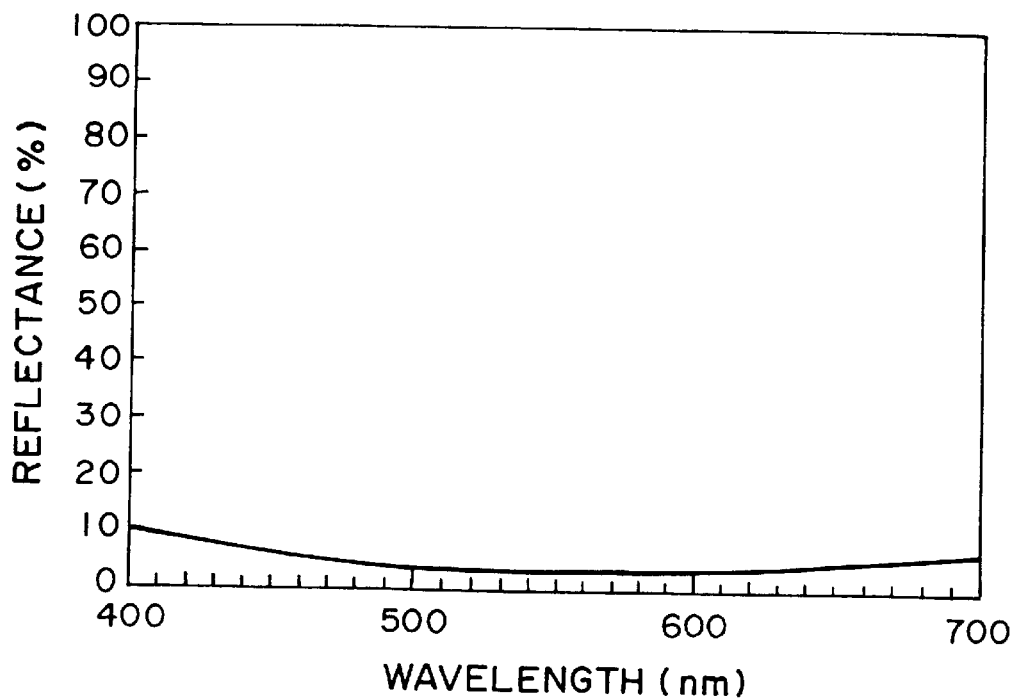
FIG. 15 is a graph showing a relationship between a reflectance and a wavelength as an effect of the seventh embodiment.

As a result, the masking film 76 showed a reflectance of at most 11% in a visible region of 400–700 nm as shown in FIG. 15.

In this embodiment, when the above-prepared liquid crystal panel P is driven by supplying a prescribed signal to the transparent electrodes 9 and 10 while illuminating it with light from the backlight unit, the liquid crystal 11 is caused to effect switching for each pixel, whereby transmitted light provides various data or information in combination with the color filters 5 (through which the light passes).

In this embodiment, the first layer 76a comprising a metal compound containing Mo—Ta alloy and both C and O is used, whereby the reflectance of the masking film 76 is lowered to a practically acceptable level due to a reflectance-reducing function of the first layer 76a. Accordingly, even when the display apparatus 70 is used in a light place (e.g., outdoors) and external light from a viewer side A (shown in FIGS. 13 and 14) falling on the apparatus, the incident (external) light is less reflected at the surface of the first layer 76a. Further, in this embodiment, the masking film 76 also includes the second layer 76b comprising a metal (Mo—Ta alloy) excellent in a light-interrupting property, whereby transmission of a backlight and an external light can be suppressed. Accordingly, when compared with the conventional masking film-forming steps (e.g., dying with a black dye or wet-coating and patterning of a black ink as described above), the masking film-forming step adopted in this embodiment is effective in improving a light-interrupting property and a positional accuracy of the resultant masking film in addition to a reflectance-reducing property, thus providing a color liquid crystal display apparatus with a good display performance and a good balance of the light-interrupting and reflectance-reducing properties.

In this embodiment, as described above, the masking film 76 is constituted by the metal compound film 76 a (Mo—Ta alloy containing C and O) and the metal film 76b (Mo—Ta alloy), thus suppressing uneven (stepwise) side surfaces of the masking film 76 caused by etching to provide a high-accuracy masking film 76.

In this embodiment, the metal compound film 76 (containing both C and O) shows less fluctuation in extinction coefficient $k_1$ when compared with that containing only O under identical film-forming (sputtering) conditions, thus stably providing an excellent reflectance-reducing property. As a result, the display apparatus 70 is improved in display quality and yield during a production process.

In this embodiment, the masking film 76 is formed by using the reactive sputtering process using a mixture gas of Ar and $CO_2$, thus being excellent in controllability and reproducibility to readily obtain the metal compound film 76a with a good property and also readily provide the metal film 76b by stopping the supply of $CO_2$ gas. As a result, the production cost is reduced.

(Eighth Embodiment)

Figure 16:
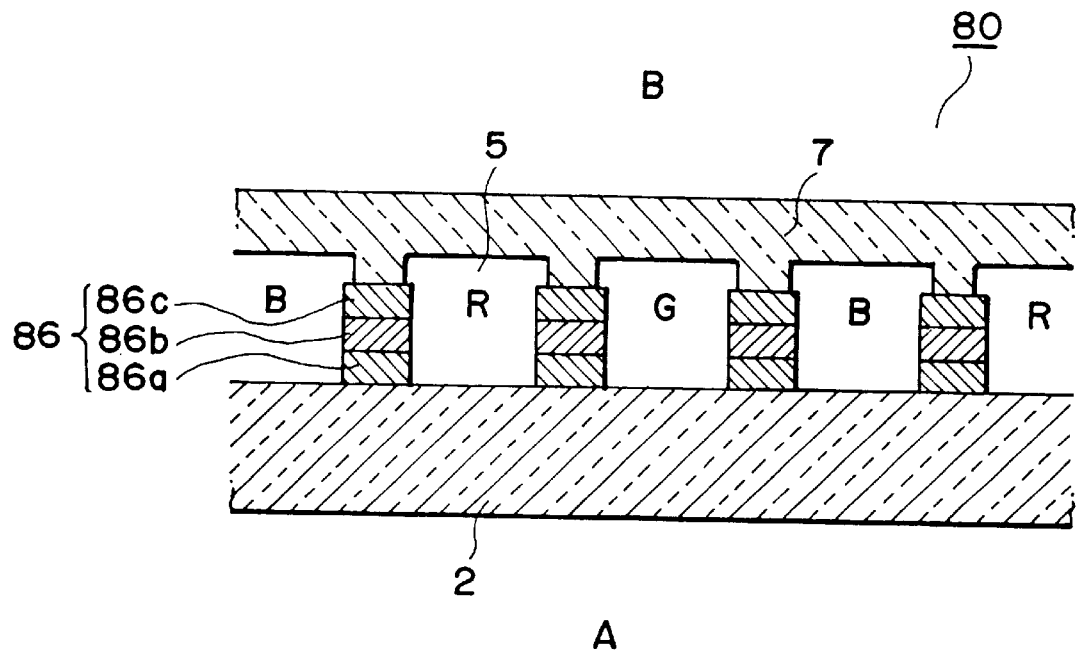
FIG. 16 is a schematic sectional view of an enlarged masking member portion adopted in an eighth embodiment (appearing hereinafter) according to the present invention.

A color liquid crystal display apparatus 80 partially shown in FIG. 16 according to this embodiment has a structure identical to that of the Seventh embodiment except that a masking film 86 has a lamination structure comprising three layers and is formed in the following manner.

First to third layers 86a, 86b and 86c constituting the masking film 86 were formed on a transparent substrate 2 in the same manner as in the Seventh embodiment under the following conditions.

| Condition | 1st layer | 2nd layer | 3rd layer |
|---|---|---|---|
| Target | Mo-Ta | Al | Mo-Ta |
| Power (W/cm$^2$) | 4.2 | 11.0 | 4.2 |
| Gas pressure (Pa) | 0.67 | 0.67 | 0.67 |
| Flow rate (Ar:O$_2$) | 50:20 | 50 (Ar) | 50:20 |
| Thickness (Å) | 552 | 705 | 552 |

The thus formed first to third layers 86a, 86b and 86c showed the following refractive indices n and extinction coefficients k measure in the same manner as in the Seventh embodiment.

| Layer | n | k |
|---|---|---|
| 1st layer 86a | 2.382 | 0.753 |
| 2nd layer 86b | 3.319 | 3.703 |
| 3rd layer 86c | 2.382 | 0.753 |

In this embodiment, the transparent substrate 2 and the protective layer 7 respectively showed a refractive index of about 1.52.

According to this embodiment, on the surface of the second layer (metal (Mo—Ta alloy) layer) 86b, the third layer (metal compound (Mo—Ta alloy containing C and O) 86c is formed, whereby the reflection of a backlight from the backlight unit B is reduced as shown in FIG. 17 (i.e., a reflectance of at most 4.1% in a visible region of 400–700 nm), thus preventing a malfunction of the display apparatus 80 resulting from the backlight reflection. Incidentally, in this embodiment, the reflectance measured by using light from the backlight side B substantially equal to that measured by using light from the viewer side A (FIG. 16) since the refractive index (n=1.52) of the protective layer 7 is substantially equal to that of the transparent substrate 2.

Further, according to this embodiment, the above-described advantageous effects in the Seventh embodiment are attained similarly by adopting a combination of the metal compound layers (Mo—Ta alloy containing C and O) 86a and 86c and the metal layer (Mo—Ta alloy) 86b.

(Ninth Embodiment)

A color liquid crystal display apparatus according to this embodiment has a structure identical to that of the Seventh embodiment shown in FIGS. 13 and 14 except that a masking layer 76 is formed in the following manner.

A first layer 76a was formed on a transparent substrate 2 by reactive sputtering in the same manner as in the Seventh embodiment under the following conditions while decreasing a $CO_2$ gas flow (sccm) at a rate of 4 sccm/min by mass-flow control.

| Condition | First layer |
|---|---|
| Target | Mo-Ta |
| Power (W/cm$^2$) | 4.0 |
| Gas pressure (Pa) | 0.67 |
| Ar flow (sccm) | 50 (constant) |
| CO$_2$ flow (sccm) | 30 to 10 (changed) |
| Thickness (Å) | 1150 |

The first layer 26a was controlled to have a carbon content and an oxygen content each continuously decreasing from the glass substrate side to second layer side in its thickness direction. Incidentally, the O content and C content may be determined by secondary ion mass spectrometry (SIMS) or electron spectroscopy for chemical analysis (ESCA).

On the first layer 76a, a 500 Å-thick second layer 76b was formed in the same manner as in the Seventh embodiment.

The thus-formed masking film 76 showed a reflectance of at most 5% in a visible region of 400–700 nm as shown in FIG. 18 measured in the same manner as in the Seventh embodiment.

According to this embodiment, when compared with the display apparatus of the Seventh embodiment, the reflectance of an external light is further lowered (FIGS. 18 and 15).

Further, according to this embodiment, the above-described advantageous effects in the Seventh embodiment are attained similarly by adopting a combination of the metal compound layer (Mo—Ta alloy containing C and O) 76a and the metal layer (Mo—Ta alloy) 76b.

In order to evaluate the influence of metal species or the reflectance, six species of a metal compound layer each containing C and O were prepared and subjected to measurement of reflectance in the same manner as in the Seventh embodiment, whereby the following results were obtained.

|  | <Metal species> | | | | | |
| --- | --- | --- | --- | --- | --- | --- |
|  | Mo | Cr | Al | Ta | Ti | W |
| Reflectance (%) | 1.2 | 0.3 | 8.0 | 1.5 | 0.5 | 2.5 |

As apparent from the above results, Mo, Cr and Ti were found to lower the reflectance of the metal compound layer (containing C and O). Further, similar results are obtained by using alloys of these metals. However, Cr, Ti, Cr alloy and Ti alloy require a larger production (treatment) cost compared with Mo and Mo alloy. In this respect, Mo and Mo alloy (e.g., Mo—Ta) may particularly preferably be used in the present invention.

Incidentally, the extinction coefficients k the metal compound layer (containing Mo—Ta alloy C and O), in the above Seventh and Eighth embodiments are set to be 0.319 and 0.753, respectively, but the extinction coefficient k may vary in a range of 0.2–1.0.

We have confirmed that the range of the extinction coefficient may preferably be 0.2–1.0 by the following experiment.

Six masking films were prepared and subjected to measurement of extinction coefficient k at 550 nm and reflectance (%) at 550 nm in the same manner as in the Seventh embodiment except for changing a gas flow ratio (Ar:$CO_2$) of a metal compound layer as follows.

|  | 1 | 2 | 3 | 4 | 5 | 6 |
| --- | --- | --- | --- | --- | --- | --- |
| $CO_2$ (sccm) | 10 | 15 | 20 | 30 | 35 | 40 |
| Ar (sccm) | 50 | 50 | 50 | 50 | 50 | 50 |

Figure 19:
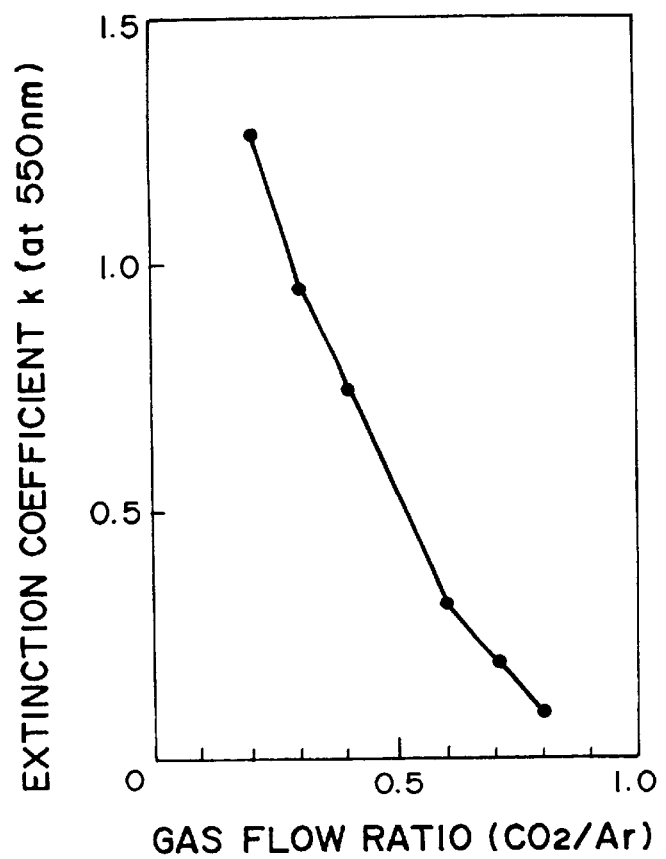
FIG. 19 is a graph showing a relationship between a gas flow ratio and an extinction coefficient.
Figure 20:
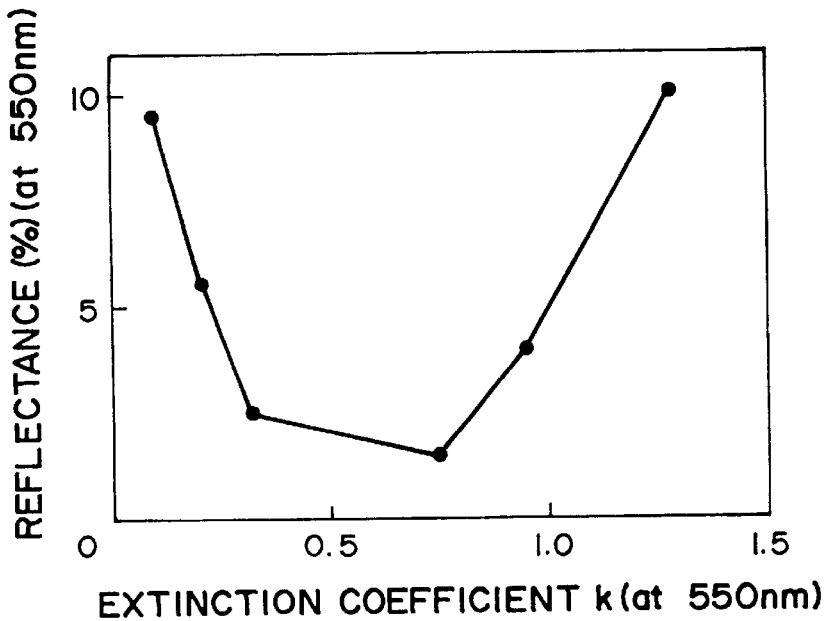
FIG. 20 is a graph showing a relationship between an extinction coefficient and a reflectance.

The results are shown in FIG. 19 (extinction coefficient vs. gas flow ratio) and FIG. 20 (reflectance vs. extinction coefficient), respectively.

Further, six liquid crystal display apparatus were prepared by using the above masking films, respectively, and were subjected to eye observation to evaluate display quality (as an effect of decreasing the external light reflection). As a result, in case where an extinction coefficient k was 0.22, 0.32, 0.75 and 0.95, an excellent display quality was confirmed. On the other hand, extinction coefficients of 0.1 and 1.27 led to less display qualities.

As described in the Seventh to Ninth embodiments of the present invention, each of the layers (76a, 76b, 76a, 86b, 86c and 86c) constituting the masking films (76 and 86) contain an Mo—Ta alloy (Mo:Ta=85 wt. %:15 wt. %).

In these embodiments, the respective layers constituting the masking film may independently contain another metal element selected from the group consisting of Mo, Cr, Al, Ta, Ti, W and alloys of these metals.

Further, in the above embodiments, as an ambient gas for the sputtering step, a mixture gas of Ar and $CO_2$ is principally used but may be a mixture of $CH_4$ and $O_2$.

Further, in the Seventh to Ninth embodiments, as a sputtering target, the Mo—Ta alloy target is used but may be replaced by an Mo—Ta alloy containing (only) C, an Mo—Ta alloy containing (only) O, an Mo—Ta alloy containing (both) C and O or other metals or alloys containing at least one of C and O.

In the above-described First to Ninth embodiments, although the display apparatus according to the present invention is explained by using the liquid crystal display apparatus as an example therefor, the display apparatus of the present invention may also include other display apparatus including plasma display devices and EL (electro-luminescent) display devices each provided with a masking (light-interrupting) member disposed between pixels. Further, the display apparatus of the present invention may also be used as a monochromatic (white and black) display apparatus by omitting the color filters.

What is claimed is:

1. A process for producing a displaying apparatus of the type comprising a planar optical modulation device comprising a transparent substrate and a plurality of pixels disposed thereon so as to be each capable of optical modulation thereat, and a masking member disposed on the transparent substrate and with spacings; said process comprising:

a step of sputtering a target comprising an alloy of Mo and Ta in an ambient gas including C, O and Ar to form a layer of a metal compound comprising Mo, Ta, C and O for providing a masking member.

2. A process for producing a display apparatus of the type comprising a planar optical modulation device comprising a transparent substrate and a plurality of pixels disposed thereon so as to be each capable of optical modulation thereat, and a masking member disposed with spacings and including a first layer, a second layer and a third layer; said process comprising the steps of:

forming the first layer on a transparent substrate by sputtering, forming the second layer on the first layer by sputtering, and forming the third layer on the second layer by sputtering;

wherein the first to third layers are respectively formed by using an ambient gas comprising Ar and at least one of C and O, the first and third layers are respectively formed by using a target comprising Mo, and the second layer is formed by using a target comprising AL or Si.

3. A process according to claim 2, wherein the target used for forming the first and third layers comprises an alloy of Mo and Ta.

4. A process according to claim 2, wherein the ambient gas comprises a mixture gas of Ar and $CO_2$ in the steps for forming the first to third layers.

5. A process according to claim 2, wherein said sputtering is performed by changing a sputtering power so as to provide an objective layer with a prescribed refractive index and a prescribed extinction coefficient.

6. A process for producing a display apparatus of the type comprising a planar optical modulation device comprising a transparent substrate and a plurality of pixels disposed thereon so as to be each capable of optical modulation thereat, and a masking member disposed with spacings and including a first layer and a second layer; said process comprising the steps of:

forming the first layer on the transparent substrate by sputtering with a target comprising an alloy of Mo and Ta in an ambient gas comprising a mixture gas of Ar and $CO_2$, the first layer comprising a layer of a metal compound comprising C, O, Mo and Ta, and forming the second layer on the first layer by sputtering with a target comprising a metal element selected from the group consisting of Ti, Cr, Al, Ta, Mo and W and with an ambient gas of Ar, the second layer comprising a layer of at least one metal element selected from the group consisting of Ti, Cr, Al, Ta, Mo and W.

* * * * *

UNITED STATES PATENT AND TRADEMARK OFFICE
CERTIFICATE OF CORRECTION

PATENT NO.   : 6,366,332 B1
DATED        : April 2, 2002
INVENTOR(S)  : Hiroyuki Suzuki et al.

It is certified that error appears in the above-identified patent and that said Letters Patent is hereby corrected as shown below:

<u>Column 9,</u>
Line 51, "making" should read -- masking --.

<u>Column 14,</u>
Line 11, "Al-Ta" should read -- Al --.

Signed and Sealed this

Fifteenth Day of October, 2002

*Attest:*

JAMES E. ROGAN
*Attesting Officer*  *Director of the United States Patent and Trademark Office*